United States Patent
Zhang et al.

(10) Patent No.: US 10,923,079 B2
(45) Date of Patent: Feb. 16, 2021

(54) DUAL-CELL DISPLAY APPARATUS

(71) Applicant: Hisense Visual Technology Co., Ltd., Shandong (CN)

(72) Inventors: Yuxin Zhang, Shandong (CN); Aichen Xu, Shandong (CN); Caixia Zhao, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/692,572

(22) Filed: Nov. 22, 2019

(65) Prior Publication Data

US 2020/0320957 A1 Oct. 8, 2020

Related U.S. Application Data

(63) Continuation of application No. PCT/CN2019/115547, filed on Nov. 5, 2019.

(30) Foreign Application Priority Data

Apr. 4, 2019 (CN) .......................... 2019 1 0272468

(51) Int. Cl.
*G09G 5/00* (2006.01)
*G09G 5/10* (2006.01)
(Continued)

(52) U.S. Cl.
CPC ......... *G09G 5/10* (2013.01); *G02F 1/133528* (2013.01); *G02F 1/133602* (2013.01); *G09G 2320/0626* (2013.01)

(58) Field of Classification Search
CPC .... G09G 5/00; G09G 5/10; G09G 2320/0626; G02F 1/133528; G02F 1/133602
See application file for complete search history.

(56) References Cited

U.S. PATENT DOCUMENTS 4,952,036 A * 8/1990 Gulick .............. G02F 1/133526
349/179
8,345,038 B2 * 1/2013 Kerofsky ............. G09G 3/3406
345/214

(Continued)

FOREIGN PATENT DOCUMENTS

CN 103226929 A 7/2013

OTHER PUBLICATIONS

ISA State Intellectual Property Office of the People's Republic of China, International Search Report Issued in Application No. PCT/CN2019/115547, dated Feb. 6, 2020, WIPO, 5 pages.

*Primary Examiner* — Joe H Cheng
(74) *Attorney, Agent, or Firm* — Brinks Gilson & Lione

(57) ABSTRACT

The present disclosure describes a dual-cell display apparatus. The apparatus includes a first panel, and a second panel disposed in a first preset order relative to the first panel. The apparatus includes a memory storing instructions; and a processor in communication with the memory. When executing the instructions, the processor is configured to receive an image signal, and generate dimming data for the first panel according to the image signal. When executing the instructions, the processor is also configured to generate image data for the second panel according to the image signal, and generate backlight data for backlight control according to the image signal.

14 Claims, 20 Drawing Sheets

(51) Int. Cl.
   *G02F 1/1335*   (2006.01)
   *G02F 1/13357*  (2006.01)

(56) References Cited

U.S. PATENT DOCUMENTS

| | | | | |
|---|---|---|---|---|
| 9,864,243 | B2* | 1/2018 | Erinjippurath | G09G 3/3426 |
| 2009/0015755 | A1* | 1/2009 | Bang | G09G 3/3426 |
| | | | | 349/65 |
| 2009/0027323 | A1* | 1/2009 | Choi | G02F 1/13471 |
| | | | | 345/88 |
| 2009/0121985 | A1 | 5/2009 | Kang et al. | |
| 2009/0284181 | A1* | 11/2009 | Kim | G09G 3/3426 |
| | | | | 315/307 |
| 2011/0141166 | A1* | 6/2011 | Ahn | G09G 3/3426 |
| | | | | 345/691 |
| 2011/0279749 | A1 | 11/2011 | Erinjippurath et al. | |
| 2012/0200609 | A1* | 8/2012 | Choi | G09G 3/3648 |
| | | | | 345/690 |
| 2013/0106923 | A1* | 5/2013 | Shields | G09G 3/3406 |
| | | | | 345/690 |
| 2013/0194167 | A1 | 8/2013 | Yun et al. | |
| 2013/0335682 | A1* | 12/2013 | Gilbert | G09G 3/3607 |
| | | | | 349/85 |
| 2014/0049571 | A1* | 2/2014 | Erinjippurath | G02F 1/13471 |
| | | | | 345/690 |
| 2015/0154922 | A1* | 6/2015 | Masuda | G09G 3/2088 |
| | | | | 345/102 |
| 2016/0155402 | A1* | 6/2016 | Hoshino | G09G 3/3406 |
| | | | | 345/690 |
| 2016/0170702 | A1 | 6/2016 | Jiang et al. | |
| 2016/0293113 | A1* | 10/2016 | Yoo | G09G 3/3666 |
| 2020/0051512 | A1* | 2/2020 | Li | G09G 3/3426 |
| 2020/0320941 | A1* | 10/2020 | Ge | G09G 5/10 |

* cited by examiner

900

Converting an RGB value of a second pixel into a brightness value (a Y value) of the second pixel
901

Down-sampling a brightness value of the second pixel to a brightness value of a first pixel
902

Determining a local brightness adjustment factor and a global brightness adjustment factor by performing statistics processing for the local region brightness values and the global image brightness values according to the brightness value of each first pixel
903

Calculating a brightness drive signal corresponding to the first pixel according to the brightness value of each first pixel, the local brightness adjustment factor and the global brightness adjustment factor
904

FIG. 9B

# DUAL-CELL DISPLAY APPARATUS

CROSS REFERENCE TO RELATED APPLICATIONS

This application is a continuation application of International Application No. PCT/CN2019/115547 filed on Nov. 5, 2019, which claims priority to Chinese Patent Application No. 201910272468.9 filed on Apr. 4, 2019, the entire content of which is incorporated herein by reference.

TECHNICAL FIELD

The present disclosure relates to display technology, and in particular to a dual-cell display apparatus.

BACKGROUND

In recent years, with continuous development of display technology, people have increasing requirements for image quality, where an image contrast is an important consideration factor. Therefore, dual-cell display technology is proposed in the industry, that is, two liquid crystal panels are stacked together, so that a brightness of a dark frame (i.e., a black picture or a dark picture displayed on the dual-cell display apparatus) is reduced through cooperation of upper and lower panels. In this way, a static contrast of a liquid crystal television is significantly increased. In a dual-cell display apparatus, there is a need to improve brightness control of the dual-cell display apparatus.

SUMMARY

The present disclosure provides a dual-cell display apparatus. The apparatus includes a first panel, and a second panel disposed in a first preset order relative to the first panel. The apparatus includes a memory storing instructions; and a processor in communication with the memory. When executing the instructions, the processor is configured to receive an image signal, and generate dimming data for the first panel according to the image signal. When executing the instructions, the processor is also configured to generate image data for the second panel according to the image signal, and generate backlight data for backlight control according to the image signal.

BRIEF DESCRIPTION OF THE DRAWINGS

To describe examples of the present disclosure more clearly, drawings required in descriptions of the examples of the present disclosure will be briefly introduced below. It is apparent that the drawings described below are merely some examples of the present disclosure and other drawings may also be obtained by those of ordinary skill in the art based on these drawings without paying creative work.

FIG. 9B is a flowchart illustrating a method of a control system of a dual-cell display apparatus according to some examples of the present disclosure.

DETAILED DESCRIPTION OF THE EMBODIMENTS

The examples of the present disclosure will be described below in combination with accompanying drawings in the examples of the present disclosure. It is apparent that the described examples are merely part of examples of the present disclosure rather than all examples. Other examples achieved by those of ordinary skill in the art based on the examples in the present disclosure without paying creative work shall all fall within the scope of protection of the present disclosure.

In the descriptions of the present disclosure, it is to be understood that an orientation or position relationship indicated by terms such as "center", "upper", "lower", "front", "back", "left", "right", "vertical", "horizontal", "top", "bottom", "inside" and "outside" is an orientation or position relationship shown based on the accompanying drawings, and is only used to facilitate describing the present disclosure and simplify the description rather than indicate or imply that a described apparatus or element should have a particular orientation or be constructed and operated in the particular orientation, and thus shall not be construed as limiting to the present disclosure.

Figure 1A:
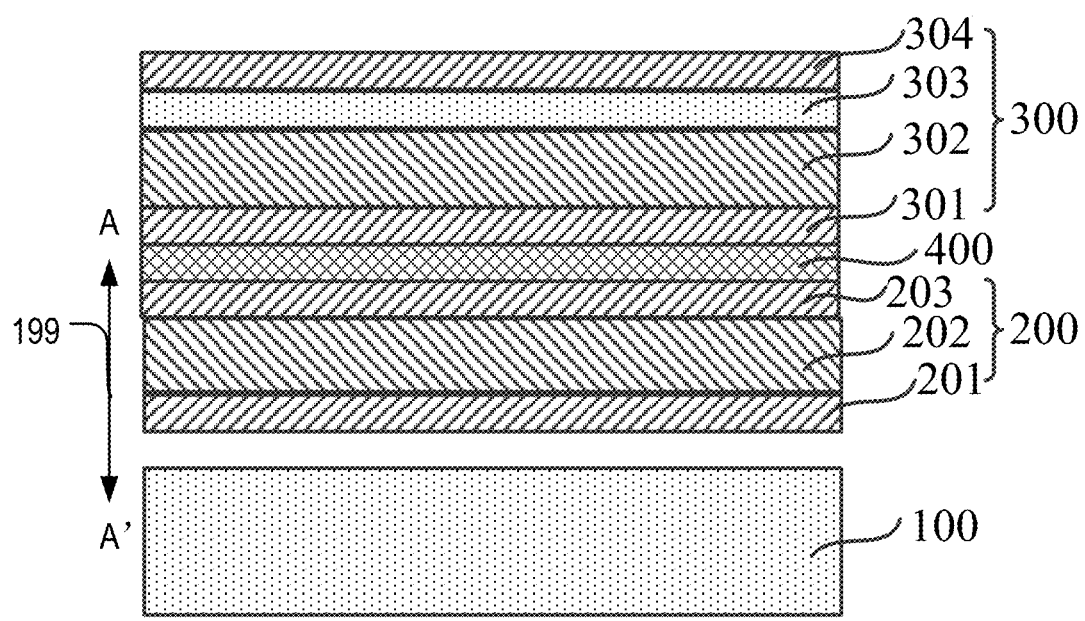
FIG. 1A is a schematic diagram illustrating an exploded structure of a dual-cell display apparatus according to some examples of the present disclosure.
Figure 1B:
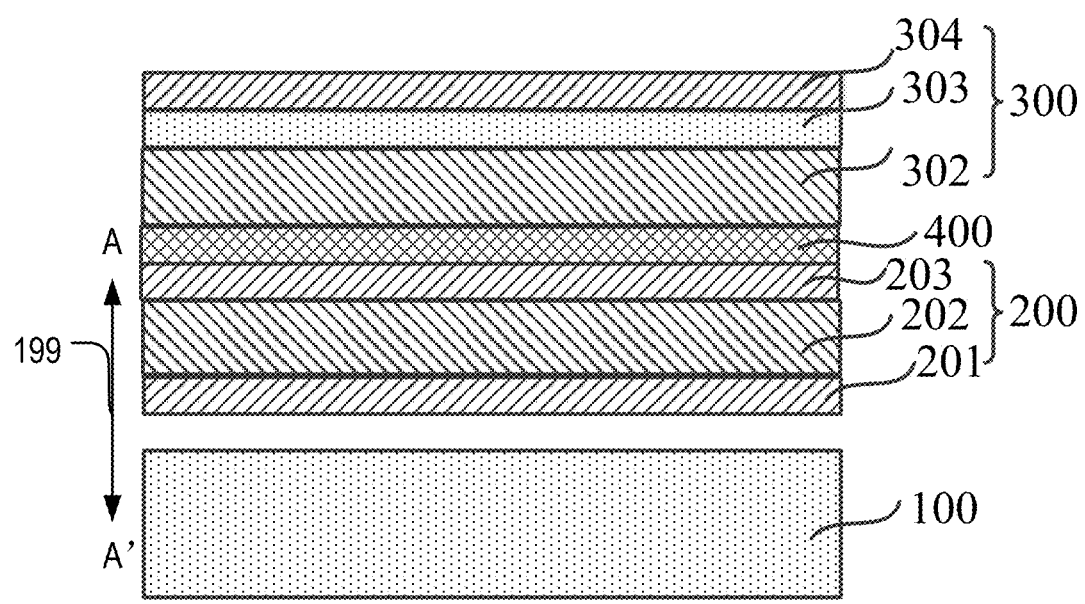
FIG. 1B is a schematic diagram illustrating an exploded structure of another dual-cell display apparatus according to some examples of the present disclosure.
Figure 2:
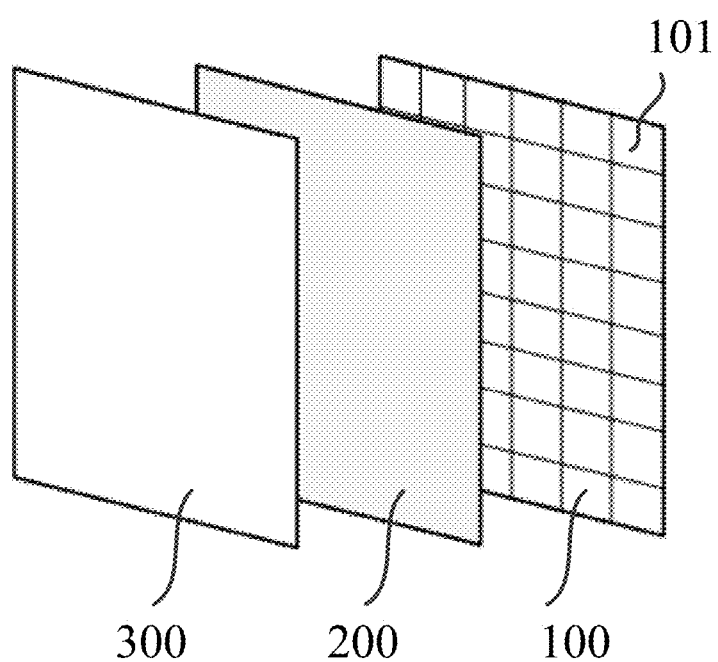
FIG. 2 is a block diagram illustrating a principle of a dual-cell display apparatus according to some examples of the present disclosure.

In the descriptions of the present disclosure, it is to be noted that terms "install", "connection" and "connect" are to be broadly understood, unless otherwise clearly specified and defined. For example, the connection may be a contact connection, or a detachable connection, or an integrated connection. Persons of ordinary skill in the art may understand specific meanings of the above terms in the present disclosure according to a specific situation. FIG. 1A and FIG. 1B are schematic diagrams illustrating an exploded structure of a dual-cell display apparatus according to some examples of the present disclosure. FIG. 2 is a block diagram illustrating a principle of a dual-cell display apparatus according to some examples of the present disclosure.

As shown in FIG. 1A, FIG. 1B and FIG. 2, the dual-cell display apparatus includes a backlight module 100, a first panel 200, a second panel 300 and an adhesive layer 400 which are all stacked in order. The backlight module 100 is configured to provide a light source for transmitting, the first panel 200 is a light control panel for controlling a light flux for the light from the backlight module 100 into the second panel 300, the second panel 300 is a color panel for displaying an image, and the adhesive layer 400 is used to fix the first panel 200 and the second panel 300 together into an integral unit.

Referring to FIGS. 1A and 1B, along an A-A' direction 199 of the dual-cell display apparatus, the first panel 200 includes a first polarizer 201 adjacent to the backlight module 100, a first liquid crystal light valve layer 202 and a second polarizer 203 in order. Polarization direction (or the transmittance axis) of the first polarizer 201 and polarization direction of the second polarizer 203 are perpendicular to each other. The light from the backlight module 100 is converted into a first polarized light after passing through the first polarizer 201. Then, the first polarized light enters the first liquid crystal light valve layer 202. In this case, according to the contents of the displayed image, the direction of the first polarized light is rotated by controlling liquid crystal in the first liquid crystal light valve layer 202 to rotate through voltage. Then, the first polarized light with a rotated angle enters the second polarizer 203 and converts into second polarized light. Since the polarization direction of the first polarizer 201 and the polarization direction of the second polarizer 203 are perpendicular to each other, the control of the light flux entering the second panel 300 is realized. It is to be noted that the first panel 200 does not include a light filter. If the light from the backlight module 100 is white light, the first panel 200 is a monochromatic panel.

Referring to FIG. 1A, along the A-A' direction 199 of the dual-cell display apparatus, the second panel 300 includes a third polarizer 301 adjacent to the first panel 200, a second liquid crystal light valve layer 302, a filter 303 and a fourth polarizer 304 in order. Polarization direction of the third polarizer 301 and polarization direction of the fourth polarizer 304 are perpendicular to each other. The polarization direction of the second polarizer 203 and the polarization direction of the third polarizer 301 are parallel to each other. When the second polarized light from the first panel 200 enters the third polarizer 301, the second polarized light does not convert in polarization direction and then enters the second liquid crystal light valve layer 302. According to the contents of the displayed image, the polarization direction of the second polarized light is rotated by controlling liquid crystal in the second liquid crystal light valve layer 302 to rotate through voltage. The second polarized light with a rotated angle enters the filter 203 and changes into colored light. Then, the colored light enters the fourth polarizer 304 and is converted into third polarized light. Since the polarization direction of the third polarizer 301 and the polarization direction of the fourth polarizer 304 are perpendicular to each other, the control of the light flux of the colored light is realized, thereby realizing color display of an image.

When external water vapor enters between the first panel and the second panel, the water vapor will solidify into water drops due to temperature changes between the first panel and the second panel, thereby affecting the display effect. The adhesive layer 400 bonds the first panel 200 and the second panel 300 together in a surface attaching manner. The surface attaching refers to full attaching, that is, an adhesive layer is coated on the whole surface. To avoid affecting light transmission, the adhesive layer 400 may be a transparent adhesive layer, such as an Optically Clear Adhesive (OCA) or an Optical Clear Resin (OCR). To ensure a bonding effect and avoid making the dual-cell thicker, the thickness of the adhesive layer is between 0.15 mm and 0.75 mm. In some examples, the thickness of the adhesive layer is between 0.25 mm and 0.5 mm.

It is to be noted that the first panel 200 includes a polarizer, for example, the second polarizer 203, and the second panel 300 includes a polarizer, for example, the third polarizer 301. FIG. 1A illustrates a case where the first panel 200 and the second panel 300 each have two polarizers. In other examples of the present disclosure, the first panel 200 and the second panel 300 share a polarizer. FIG. 1B illustrates a case that the first panel 200 and the second panel 300 share one polarizer. In a case that a display requirement is satisfied, saving one polarizer may reduce costs of the display apparatus. As shown in FIG. 1B, a difference from FIG. 1A, is that the dual-cell display apparatus does not include the third polarizer 301. In the display apparatus, the polarization direction of the first polarizer 201 and the polarization direction of the second polarizer 203 are perpendicular to each other, and the polarization direction of the second polarizer 203 and the polarization direction of the fourth polarizer 304 are perpendicular to each other. Similar to a principle of an optical path of the dual-cell display apparatus shown in FIG. 1A, the second polarized light from the first panel 200 directly enters the second liquid crystal light valve layer 302. According to the contents of the displayed image, the polarization direction of the second polarized light is rotated by controlling liquid crystal in the second liquid crystal light valve layer 302 to rotate through voltage. The second polarized light with a rotated angle enters the filter 203 and changes into colored light. Then, the colored light enters the fourth polarizer 304 and is converted into the third polarized light. Since the polarization direction of the second polarizer 203 and the polarization direction of the fourth polarizer 304 are perpendicular to each other, the control of the light flux of the colored light is realized, thereby realizing the color display of an image.

In the dual-cell display apparatus shown in FIG. 1B, the position of the adhesive layer 400 is not limited to locating between the second polarizer 203 and the second liquid crystal light valve layer 302, which may also locate between the first liquid crystal light valve layer 202 and the second polarizer 203.

The first liquid crystal light valve layer 202 and the second liquid crystal light valve layer 302 are similar in structure and include an upper substrate, a lower substrate and a liquid crystal box located between the upper substrate and the lower substrate.

The liquid crystal light valve layers in the first panel 200 and the second panel 300 both include a plurality of liquid crystal boxes. Similar to a principle of light control in the second panel 300 (the color panel), the first panel 200 takes a single pixel as an independent light valve to realize pixel-level light control. Compared with a display apparatus with only one panel, the dual-cell display apparatus has two layers of pixel-level light control, thereby realizing a finer control. Since the first panel 200 realizes the pixel-level light control, compared with the single-cell display apparatus, a brightness of a dark frame is significantly reduced through cooperation of the first panel 200 and the second panel 300, so that a problem that the dark frame has a certain brightness due to no absolute non-transmission of the liquid crystal light valve layer in the single-cell display apparatus is solved, thereby significantly increasing a static contrast of a liquid crystal display apparatus.

Since the first panel 200 realizes light control through the polarizer and the rotation of liquid crystal and the transmittance of the polarizer is 38%-48%, the entire transmittance of the display apparatus will be reduced. In the present disclosure, a resolution of the first panel 200 to be smaller than a resolution of the second panel 300, that is, the number of pixels in the first panel 200 is set to be smaller than the number of pixels in the second panel 300, to avoid an insufficient display brightness of the display apparatus, resulting from a reduced transmittance of the light from the backlight module through the first panel due to using the dual-cell. A ratio of the number of pixels in the second panel 300 and the number of pixels in the first panel 200 is not less than 4:1, for example, 4:1 and 16:1. That is, when the resolution of the second panel 300 is 8K, the resolution of the first panel 200 is 4K or 2K; when the resolution of the second panel 300 is 4K, the resolution of the first panel 200 is 2K.

Specifically, in some examples of the present disclosure, the resolution of the first panel 200 is 1920*1080, and the resolution of the second panel 300 is 3840*2160.

In some examples of the present disclosure, as shown in FIG. 2, to further increase the image contrast, the backlight module 100 adopts multiple backlight partitions to control. That is, a backlight source in the backlight module 100 is divided into a plurality of backlight partitions 101, and the brightness of each backlight partition 101 is dynamically changed according to brightness information contained in the displayed image information. A bright area in the image corresponds to a high backlight brightness, and a dark area in the image corresponds to a low backlight brightness. Compared with constant backlight provided by the backlight module, problems that a pure black frame still has weak light leakage and power consumption is large are solved by dynamically adjusting the backlight brightness, thereby further increasing a brightness contrast of the image shown in the dual-cell display apparatus and improving the image quality.

In the dual-cell display apparatus, the problem that the black frame shown in the dual-cell display apparatus is not black enough is further solved by combining dual panels and the control of the backlight partitions, thereby a display contrast of the image is better improved.

Next, the controls of the dual-cell display apparatus for the dual panels and the multi-backlight-partition will be discussed below.

Figure 3:
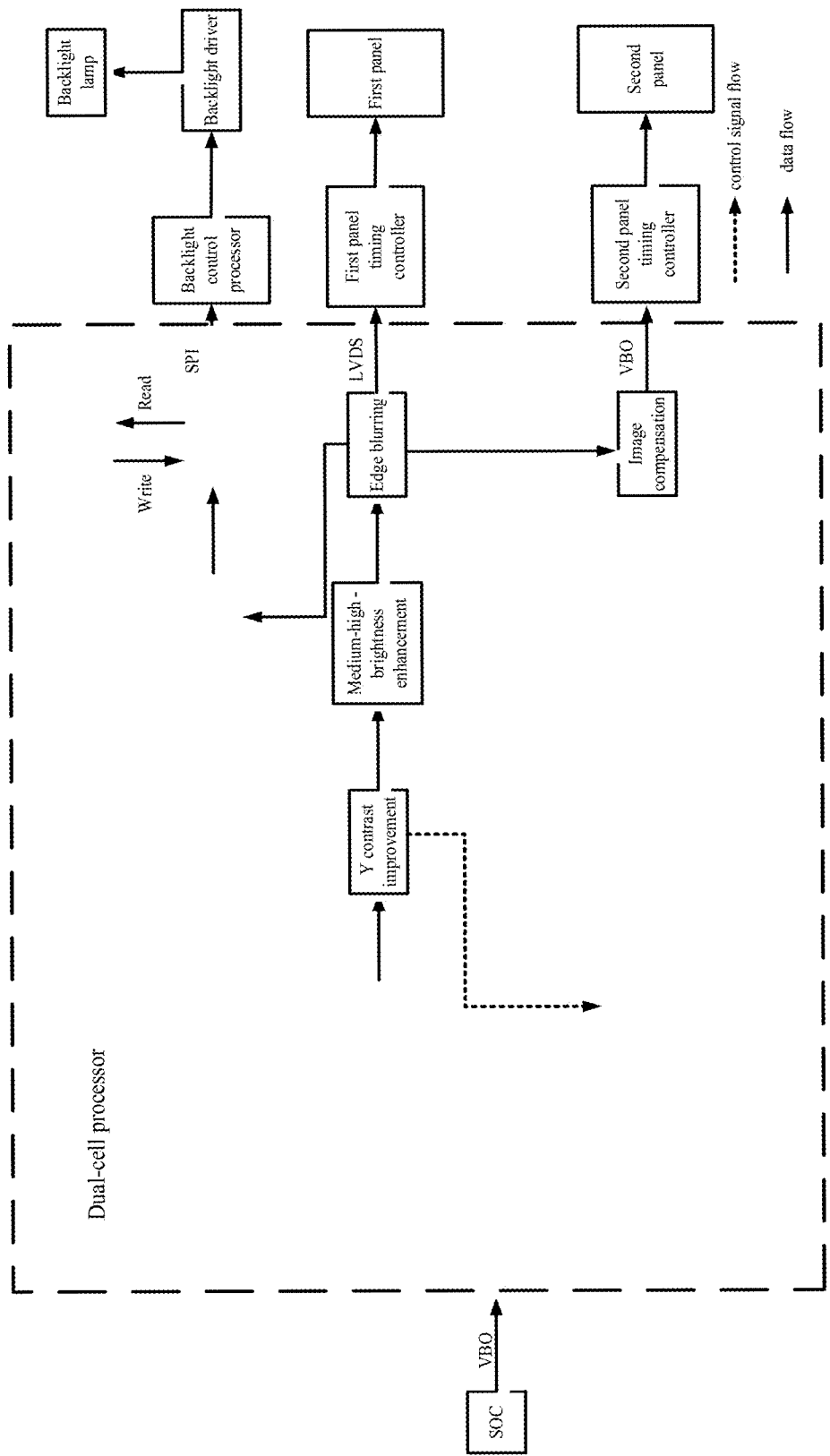
FIG. 3 is a block diagram illustrating a principle of a control system of a dual-cell display apparatus according to some examples of the present disclosure.
Figure 3A:
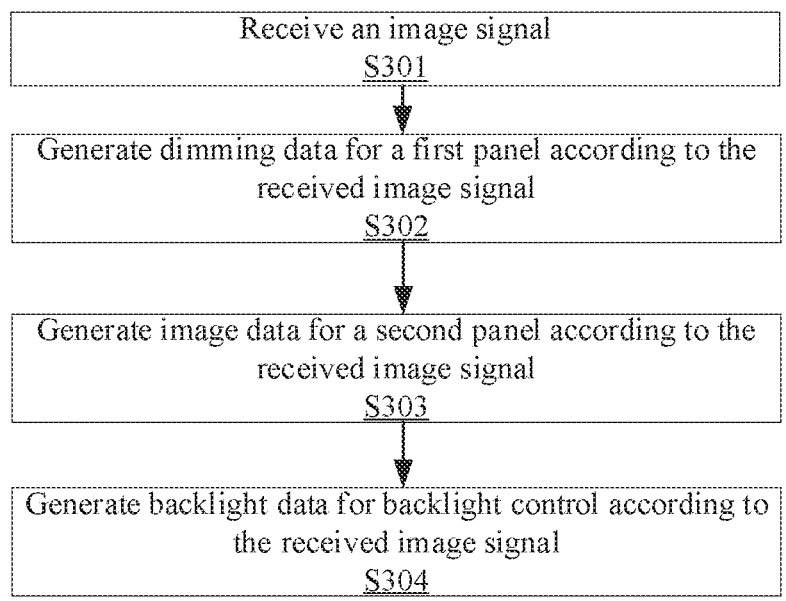
FIG. 3A is a flowchart illustrating operations by a dual-cell processor of the dual-cell display apparatus according to some examples of the present disclosure.

FIG. 3 is a block diagram illustrating a principle of a control system in a dual-cell display apparatus according to some examples of the present disclosure. FIG. 3A is a flowchart illustrating operations by a dual-cell processor of the dual-cell display apparatus according to some examples of the present disclosure. As shown in FIG. 3, the dual-cell display apparatus includes a System on Chip (SOC), a dual-cell processor, a first panel, a first panel Timing Controller (TCON), a second panel, a second panel Timing Controller (TCON), a backlight control processor, a backlight driver and a backlight lamp. The backlight control processor is, for example, a backlight control Microcontroller Unit (MCU).

The SOC outputs an image signal, and the dual-cell processor receives the image signal (Operation S301 in FIG. 3A). The dual-cell processor is configured to generate dimming data for the first panel in response to the image signal (Operation S302 in FIG. 3A), where the dimming data is sent to the first panel timing controller, and the first panel timing controller performs drive control for the first panel according to the dimming data. The dual-cell processor is further configured to generate image data for the second panel in response to the image signal (Operation S303 in FIG. 3A), where the image data is sent to the second panel timing controller, and the second panel timing controller performs display control for the second panel according to the image data. The dual-cell processor is further configured to generate backlight data for backlight control in response to the image signal (Operation S304 in FIG. 3A), where the backlight data is sent to the backlight control MCU, the backlight control MCU generates control information, such as a duty ratio and an electric current, and then sends the control information to the backlight driver, and the backlight driver realizes drive control for the backlight lamp according to the control information, such as the duty ratio and the electric current.

Descriptions will be made below with the resolution of the first panel being 1920*1080 (2K) and the resolution of the second panel being 3840*2160 (4K).

Figure 3B:
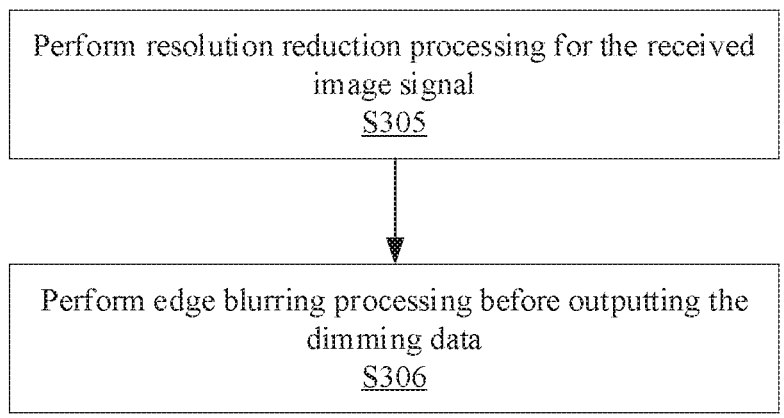
FIG. 3B is a flowchart illustrating a process of generating dimming data according to some examples of the present disclosure.

A process of generating the dimming data is described below with reference to FIG. 3B. After receiving a 4K image signal from the SOC, the dual-cell processor firstly converts an RGB value of a pixel in the image into a first brightness value (Y) of the pixel, and then generates a second brightness value corresponding to the pixel of the first panel by performing down-sampling processing for Y. In this way, resolution reduction processing from 4K to 2K is realized (Operation S305 in FIG. 3B). Then, Y contrast enhancement is performed according to the second brightness value, where the Y contrast enhancement includes brightness enhancements of a local region and an entire region. Specifically, a local brightness adjustment factor and a global brightness adjustment factor are determined by performing statistics processing for the brightness values of the local region and the brightness values of a global image according to the second brightness value, and the Y contrast enhancement is performed according to the second brightness value, the local brightness adjustment factor and the global brightness adjustment factor. Next, the brightness of a medium-high brightness area is increased by performing enhancement processing for the medium-high brightness area according to areas with different contrasts in an image. Then, edge blurring processing is performed for the medium-high brightness area, so that the smooth transition is realized between regions with different brightnesses in a frame by performing edge blurring processing for the medium-high brightness area (Operation S306 in FIG. 3B). In some examples of the present disclosure, smoothing may be performed by spatial filtering, so that a problem of unsmooth light waveforms resulting from the liquid crystal boxes split in the first panel and isolation columns between the liquid crystal boxes is solved. Finally, the dimming data generated through the above operations is transmitted to the first panel timing controller (TCON) through a Low Voltage Differential Signaling (LVDS) interface, and the first panel timing controller performs drive control for the first panel according to the dimming data.

A process of generating the image data is described below. After receiving a 4K image signal from the SOC, the dual-cell processor performs RGB contrast enhancement for the pixel to obtain a global image brightness statistical value for generating the dimming data, and performs entire and local RGB contrast enhancements according to the global image RGB value and the local region RGB value, so that a black area on the display image is blacker, and a bright area is brighter, thereby increasing the entire contrast of the image. Further, to better maintain the brightness of a low-medium-brightness area when the brightness of the first panel is reduced, corresponding image compensation is performed for the displayed image according to brightness information of the first panel. In this way, the displayed image with the brightness lost when the displayed image passes through the first panel, is compensated on the second panel. The finally-generated image data is transmitted to the second panel timing controller (TCON) through a V-By-One (VBO) interface, and the second panel timing controller performs drive control for the second panel according to the image data.

In some examples of the present disclosure, the multiple partitions control technology and the dual-cell technology are combined. If the traditional backlight control is directly combined with a dual-cell platform, two modules are completely independent. At this time, the characteristics of the dual-cell platform (the first panel will reduce the backlight transmittance) is not considered in the backlight control, therefore, the backlight control is easy to be dark. Further, more backlight partitions will cause more serious dark tendency. Therefore, a process of generating the backlight data in the present disclosure is described below.

A down-sampling module is added after the spatial filtering of the first panel. The down-sampling module directly down-samples the original 1920*1080 to a target backlight partition number, and then, performs time filtering. That is, blended data is obtained by blending the backlight value of the current frame with the backlight value of the previous frame. Then, the blended data is written into a RAM, and then read out from the RAM to finally obtain the backlight data. The obtained backlight data is transmitted to the backlight control MCU through a Serial Peripheral Interface (SPI). The backlight control MCU generates dimming information, such as a duty ratio and an electric current, and then sends the dimming information, such as the duty ratio and the electric current to the backlight driver, and the backlight driver regulates the drive control of the backlight lamp according to the dimming information, such as the duty ratio and the electric current.

The combination of the multiple backlight partitions technology and the dual-cell technology is realized in the above manner, so that a local backlight lamp is as bright as possible, thereby enabling the dual-cell display apparatus to transmits more brightness and saving hardware resources.

Figure 4:
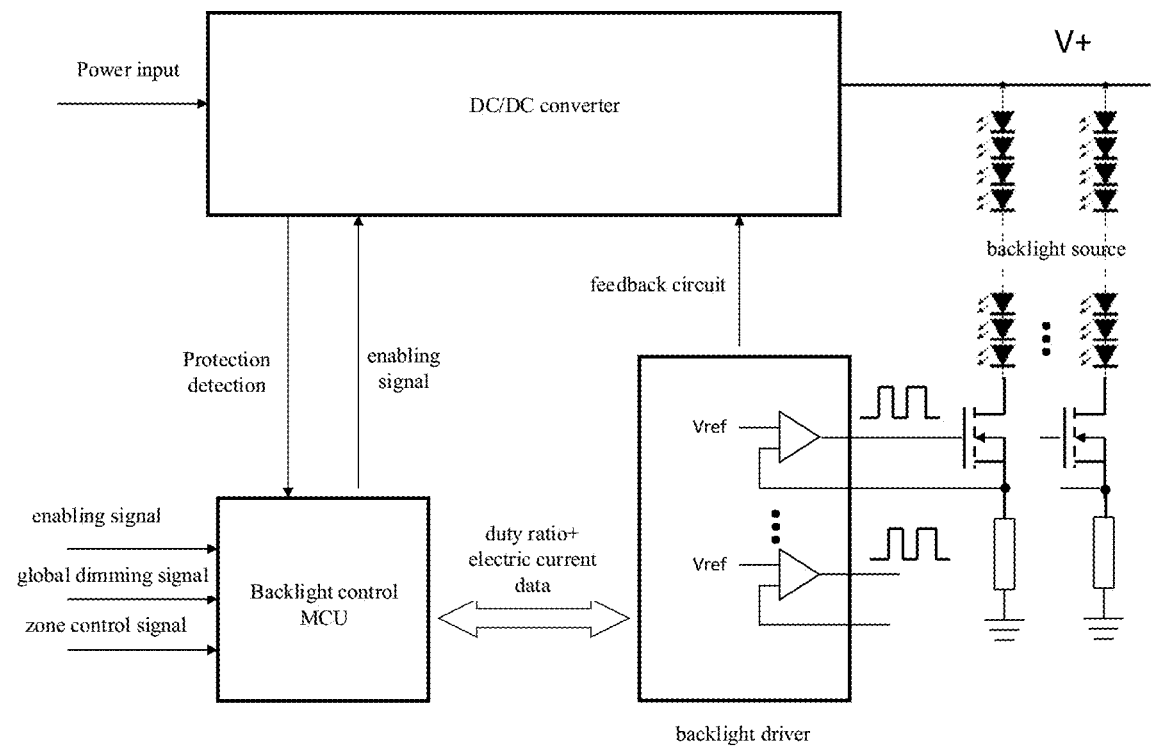
FIG. 4 is a block diagram illustrating a principle of a multi-path backlight drive in multi-partition backlight control according to some examples of the present disclosure.

FIG. 4 is a block diagram illustrating a principle of multiple backlight drive in a multiple partitions backlight control according to some examples of the present disclosure. As shown in FIG. 4, the backlight control MCU processes the brightness information of each backlight partition, searches a mapping table pre-stored in a partition mapping unit of the backlight control MCU, and adjusts the duty ratio of each backlight partition according to an obtained coordinate position of the backlight partition at the same time. The duty ratio of the backlight partition is adjusted as follows: the backlight control MCU sends backlight duty ratio data of each backlight partition to the backlight driver, for example, a Pulse-Width Modulation (PWM) driver, and a PWM driver generates a corresponding PWM drive signal to drive a backlight source (a light-emitting diode (LED) string). If necessary, the backlight control processor sends electric current data to the PWM driver which then adjusts and drives the electric current of the backlight source according to the electric current data and a preset reference voltage $V_{ref}$. Generally, the PWM driver is formed by cascading a plurality of chips, and each chip further drives the PWM driver output current to LED strings.

Further, in the dual-cell display apparatus, the first panel reduces the light transmittance, therefore the backlight control is easy to be dark, which is disadvantageous for brightness in a bright frame. Therefore, in some examples of the present disclosure, on the basis of performing backlight partitions control for the backlight module, the bright area in the image is highlighted by dynamically increasing the brightnesses of the backlight partitions of the bright frame and a conventional display frame based on the backlight peaking enhancement technology, thereby further increasing the image contrast and an image layering sense.

Figure 5:
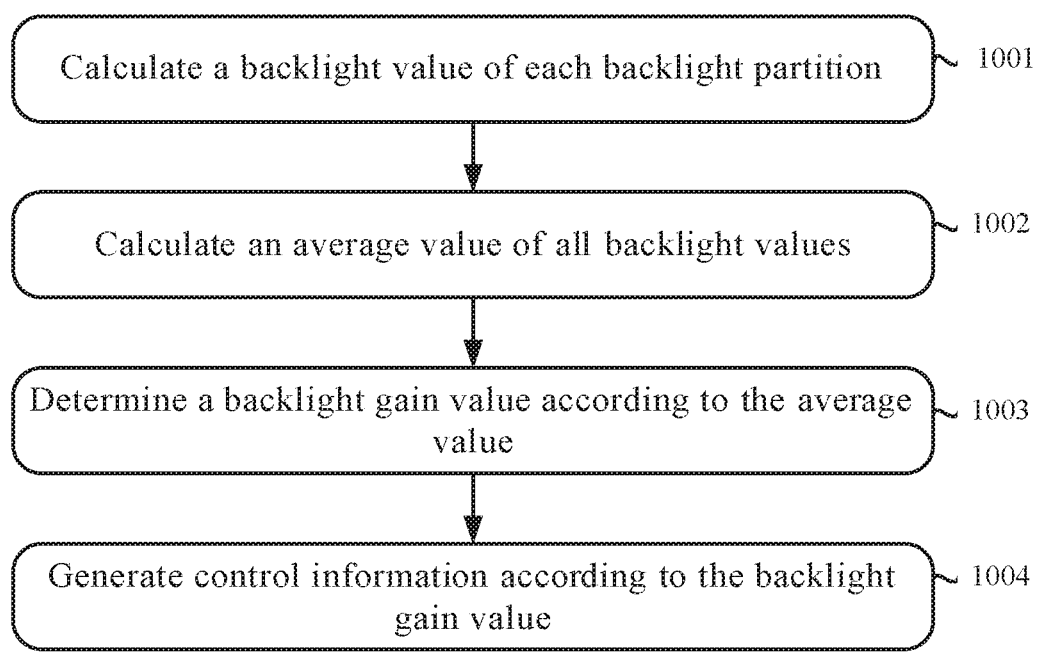
FIG. 5 is a flowchart illustrating an LED backlight peaking enhancement technology method according to some examples of the present disclosure.

As shown in FIG. 5, specific steps are described below. At step 1001, a backlight value of each backlight partition is calculated. At step 1002, an average value of all backlight values is calculated. At step 1003, a backlight gain value may be determined according to the average value, for example, by means of a preset gain curve lookup table. At step 1004, the control information for controlling the backlight module may be generated according to the backlight gain value. For example, the final backlight value is output by multiplying all backlight values by the backlight gain value. Through the above gain processing operations, the bright area of the image is highlighted, thereby improving the contrast of the image. The above steps may be implemented in the backlight control MCU.

Figure 6:
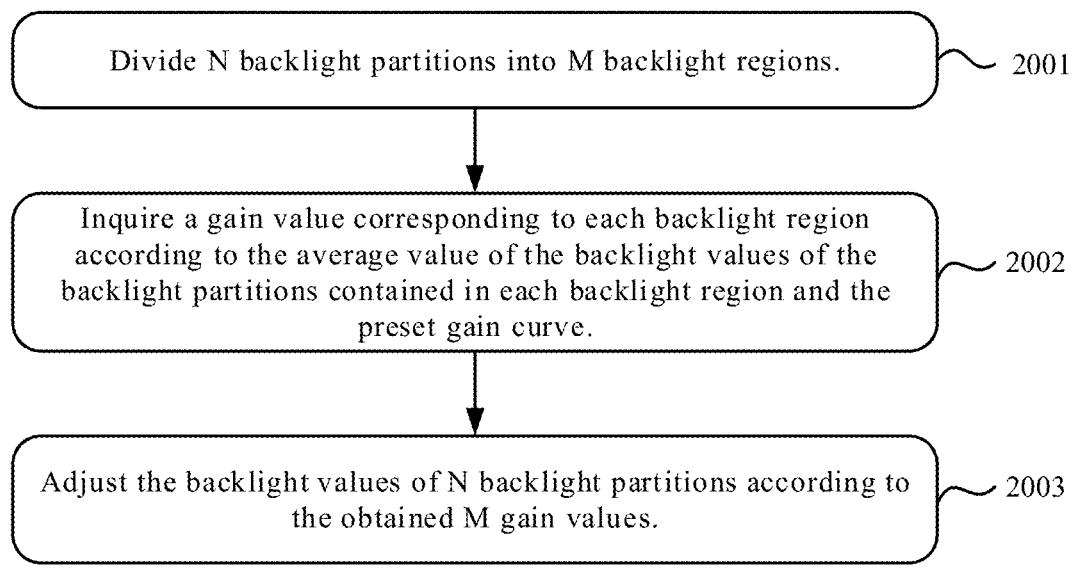
FIG. 6 is a flowchart illustrating another LED backlight peaking enhancement technology method according to some examples of the present disclosure.
Figure 7:
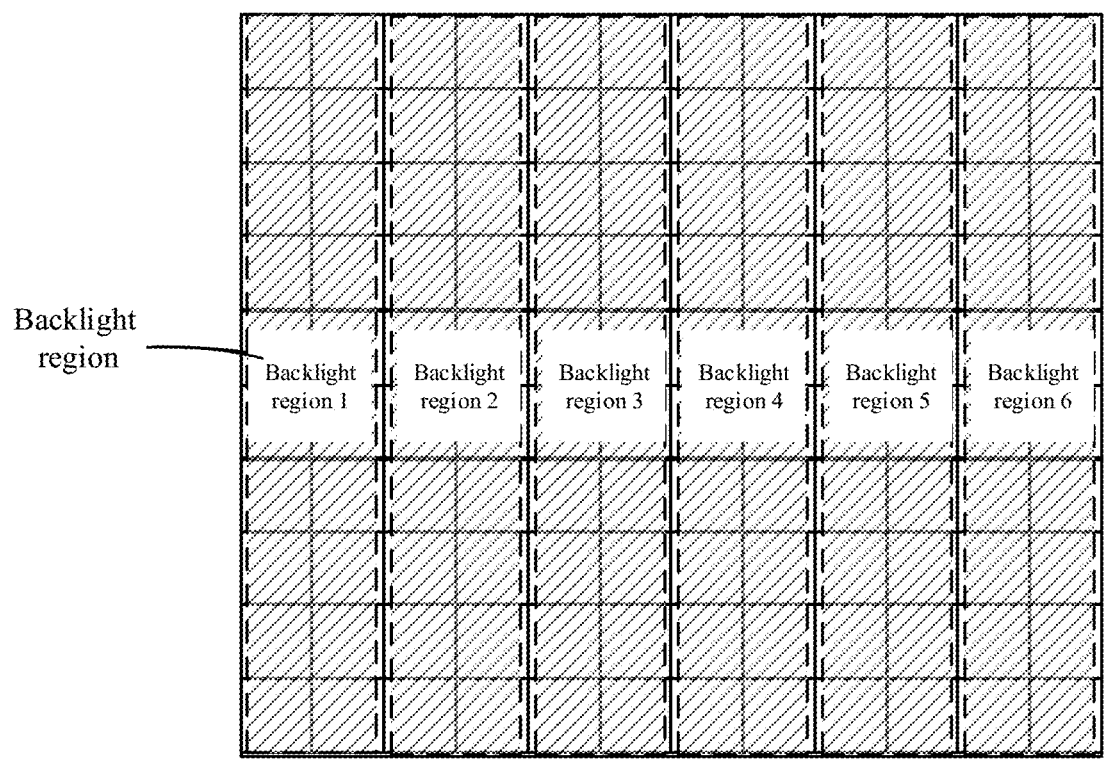
FIG. 7 is a schematic diagram of dividing a backlight partition into backlight regions according to some examples of the present disclosure.

Based on this, the contrast and the layering sense of the image may be further increased by adopting an optimized backlight value enhancement technology. The following specific steps are as shown in FIG. 6 and FIG. 7: at step 2001, N backlight partitions are divided into M backlight regions, where N is not equal to M, and M and N are integers greater than 1; at step 2002, a gain value corresponding to each backlight region is inquired according to the average value of the backlight values of the backlight partitions contained in each backlight region and the preset gain curve; at step 2003, the backlight values of N backlight partitions are adjusted according to the obtained M gain values. Different gain values are inquired for different backlight regions to realize different dimming control of different degrees for the backlight regions of the backlight partitions, thereby increasing the brightness contrast and the layering sense of the displayed image in a display process. The above steps may be implemented in the backlight control MCU.

Figure 8:
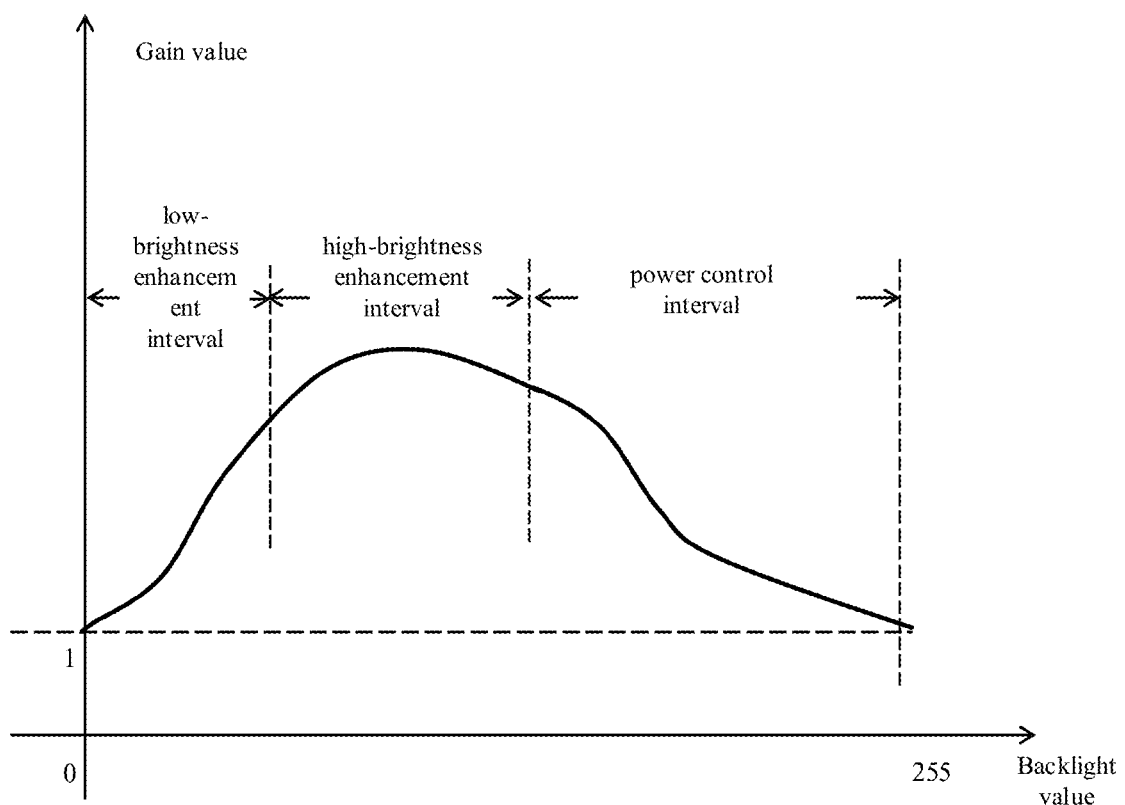
FIG. 8 is a schematic diagram illustrating a gain adjustment curve of a backlight value according to some examples of the present disclosure.

FIG. 8 is a schematic diagram illustrating a gain adjustment region of a backlight value according to some examples of the present disclosure. In FIG. 8, an abscissa is a backlight value in a value range of [0, 255], and an ordinate is a gain value in a value range of [1,+∞). However, in some examples, the value range of the gain value is set to [1, 2] according to an actual power setting requirement; further, the gain value is not limited to an integer, and thus may also be a non-integer. The gain adjustment curve is divided into a low-brightness enhancement interval, a high-brightness enhancement interval and a power control interval. When the average value of the backlight values in the backlight region is low, a corresponding gain value is in the low-brightness enhancement interval. Along with a change of a displayed content in the backlight region, when the average value of the backlight values in the backlight region is in an appropriate threshold range, the gain value is in the high-brightness enhancement interval. The high-brightness area in the image is well highlighted by adjusting the backlight value according to the gain value of the high-brightness enhancement interval. When the average value of the backlight values in the backlight region is high, because the brightness of the entire image in the backlight region is sufficiently high, it is not required to enhance the backlight value again. On the contrary, because of power consumption, it is required to decrease the gain value. Since the average values of the backlight values in different backlight regions are different, a determined gain value is also different. By adjusting the backlight value with the gain value, the brightness contrast of the image is increased and the layering sense of the image becomes obvious in the displaying process.

The brightness control and the display control of the dual-cell display apparatus and the combination of the dual-cell technology and the dynamic backlight control technology in the display apparatus are both realized by including a processor with the above functions in the dual-cell display apparatus.

Descriptions will be made to the processes of enhancing Y contrast and RGB contrast below by starting from RGB-Y. A second pixel is on the second panel, and a first pixel is on the first panel.

Figure 9A:
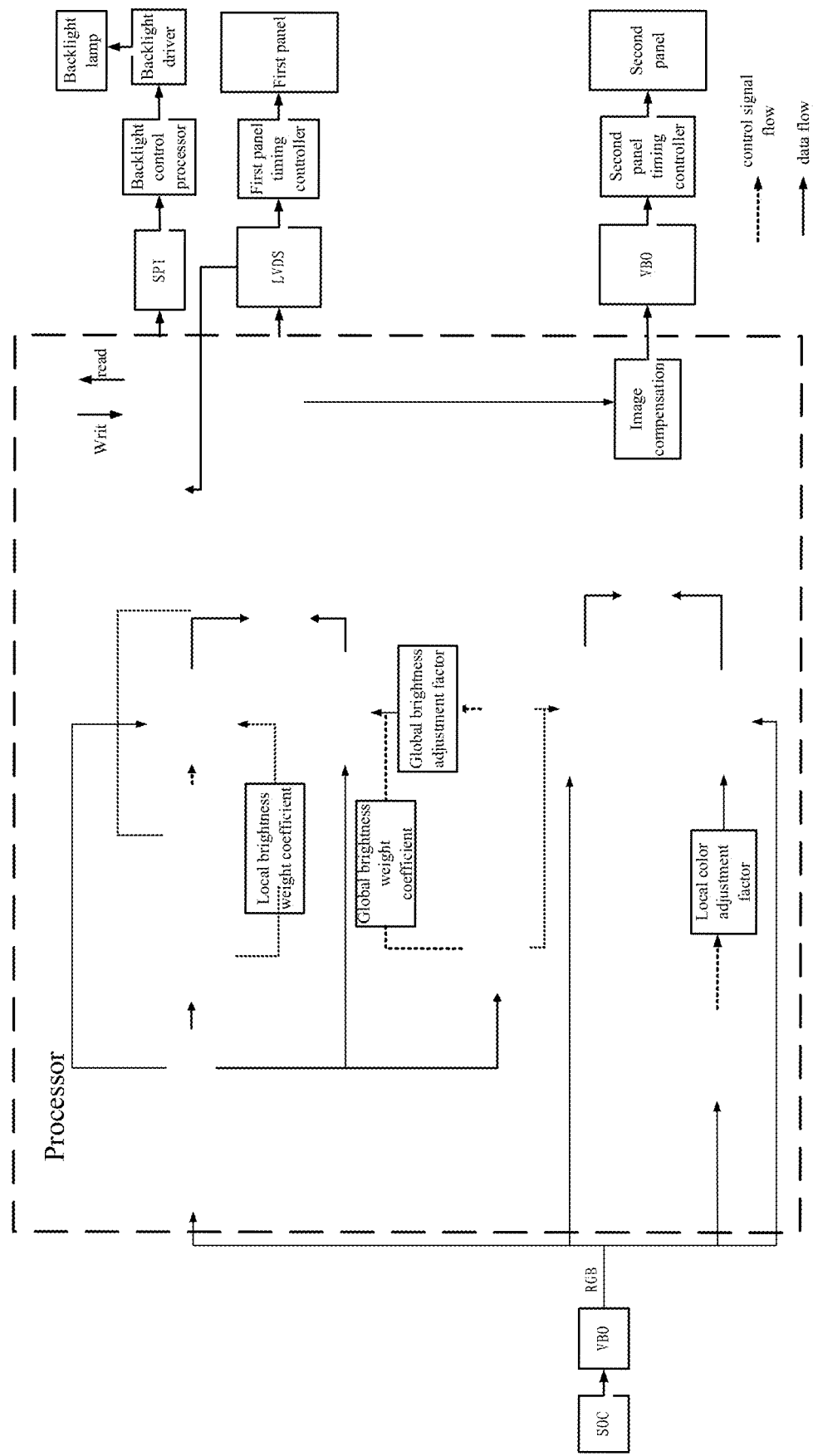
FIG. 9A is a block diagram illustrating a detailed principle of a control system of a dual-cell display apparatus according to some examples of the present disclosure.

FIG. 9A is a block diagram illustrating a detailed principle of a control system in a dual-cell display apparatus according to some examples of the present disclosure. As shown in FIG. 9B, a method 900 for enhancing the Y contrast and the RGB contrast includes the following steps 901-904.

At step 901, converting an RGB value of a second pixel into a brightness value (a Y value) of the second pixel.

An RGB color space used mostly in a computer corresponds to red, green and blue correspondingly, and different colors are formed by adjusting ratios of three-color components. Generally, these three colors are stored by using 1, 2, 4, 5, 16, 24 and 32 bits. In some examples of the present disclosure, the RGB component is represented by 8 bits, that is, the maximum brightness value is 255.

Generally, the RGB value is converted into the Y value (the brightness value) based on the following formula.

$$Y=0.299R+0.587G+0.114B$$

In some scenarios, the Y value calculated by the above method is not reasonable. For example, when the displayed image is a pure blue frame, the RGB value is (0,0,255), and the Y value obtained through the above formula is 29. In this case, the brightness value (the Y value) of transmitted light will be much reduced compared with the RGB value (0,0, 255) in the pure blue frame.

Therefore, to enhance the contrast, a maximum value of the R, G and B values is selected as the Y value. In this way, the Y value using a maximum value of the R, G and B values is much increased compared with the Y value calculated by using the conversion formula in the pure blue frame (0,0, 255). When the RGB value is only converted into the Y value, the use of the maximum value of the RGB values is reasonable. At this time, the brightness value Y is calculated based on the following formula.

$$Y=\mathrm{MAX}(R,G,B)$$

At step 902, down-sampling a brightness value of the second pixel to a brightness value of a first pixel.

The RGB value of each second pixel of the displayed image is converted into the brightness value of the second pixel by the above method, and then, a corresponding brightness value of the first pixel is generated by down-sampling the brightness value of the second pixel.

In some examples of the present disclosure, for example, the second panel has pixels of 4 k, that is, the second panel has the second pixels of 3840*2160. The first panel has the first pixels of 1920*1080. Correspondingly, pixels of 2 k is obtained by down-sampling pixels of 4 k, that is, small squares of 1920*1080 are generated. The first pixels are in one-to-one correspondence with the small squares of the second panel. The brightness value of each first pixel is calculated in a manner as follows: 4K brightness values are scaled based on a principle that every four brightness values are scaled to one brightness value. Like general scaling, a set containing brightness values of the first pixels of 1920*1080 is finally generated by using a maximum brightness value of four pixels, an average brightness value of four pixels, a minimum brightness value of four pixels and a middle brightness value of four pixels.

At step 903, determining a local brightness adjustment factor and a global brightness adjustment factor by performing statistics processing for the local region brightness values and the global image brightness values according to the brightness value of each first pixel.

The global brightness adjustment factor includes: a global brightness down-adjustment factor global_min_y and a global brightness up-adjustment factor global_max_y.

A process of calculating global_min_y includes: determining the maximum brightness value P_frame_max, the average brightness value P_frame_avg and the minimum brightness value P_frame_min of the displayed image by traversing the brightness value set of the first pixels.

Specifically, the maximum brightness value P_frame_max, the minimum brightness value P_frame_min and the average brightness value P_frame_avg of the image are obtained by traversing the brightness value set of the first pixels, where the maximum brightness value and the minimum brightness value are not actual values but obtained according to the statistics processing. Whether the number of pixels of grayscale 0 sum=gray[0] is greater than the number of pixels of a preset grayscale is determined from 0-grayscale (that is, a brightness value that is equal to 0 in the image). If not, accumulation is performed from the number of pixels of grayscale 0 to the number of pixels of grayscale 1, that is, sum_num=gray[0]+gray[1], until the condition is satisfied. At this time, the grayscale value is P_frame_min. Similarly, whether the number of pixels of grayscale 255 sum=gray[255] is greater than the number of pixels of the preset grayscale is determined from the grayscale 255. If not, accumulation is performed from the number of pixels of grayscale 255 to the number of pixels of grayscale 254, that is, sum_num=gray[255]+gray[254], until the condition is satisfied. At this time, the grayscale value is P_frame_max. For example, the number of pixels of the minimum grayscale value is preset to 8. When there is only one pixel of grayscale 0, the number of pixels of grayscale 1 is 4; when the number of pixels of grayscale 2 is more than 3, the minimum brightness value P_frame_min is set to a grayscale value 2. Therefore, interference and jump are avoided.

Where global_min_y=f(P_frame_min), global_min_y is a function relating to P_frame_min. Similarly, where global_max_y=f(P_frame_max), global_max_y is a function relating to P_frame_max. A hardware implementation method may be a Look Up Table (LUT) method.

Optionally, the global brightness adjustment factor is calculated by black area determination of an image background, where the black area determination of the image background includes:

initializing back_black_near_flag=0; and calculating sum_gray_cont.

Specifically, a process of calculating sum_gray_cont includes: finding the black area of the image background after performing histogram statistics processing for the image, where the number sta-gray[k] of pixels distributed between the brightness values Gray_TH0 and Gray_TH1 is large and greater than NUM_TH0 (a preset value), and the number of brightness values between Gray_TH0 and Gray_TH1 is small, which is generally not greater than a threshold number TH0; counting the number cont satisfying the condition that sta-gray[k] is greater than or equal to NUM_TH0 by counting sta-gray[k] between Gray_TH0 and Gray_TH1 according to the distribution of brightness values; and counting an accumulation value sum_gray_cont of sta-gray[k] under the condition that cont is less than or equal to TH0.

For example, it is assumed that Gray_TH0=12, Gray_TH1=20 and NUM_TH0=3000. Thus, the number sta-gray[k] of pixels corresponding to the brightness values of 12, 13, 14, 15, 16, 17, 18, 19 and 20 is counted. As a result, the brightness values with sta-gray[k] being greater than or equal to 3000 are counted as the brightness value 13 and the brightness value 14. Therefore, sum_gray_cont=sta-gray[13]+sta-gray[14].

If the sum_gray_cont is greater than or equal to sum_TH (a preset value), this frame of image is determined as an image with the background being the black area, and back_black_near_flag is set to 1 at this time.

global_min_y is calculated by using two different f(P_frame_min) according to whether back_black_near_flag is 1;

if (back_black_near_flag=1), global_min_y1=f1 (P_frame_min);

if (back_black_near_flag=0), global_min_y2=f2 (P_frame_min), where global_min_y1>global_min_y2, and f1 and f2 are function curves.

The process of calculating global_min_y is global_min_y=f(P_frame_min), which is linearly adjusted. For example, f(P_frame_min)=(255−P_frame_min). Similarly, a process of calculating global_max_y is global_max_y=f(P_frame_max), which is linearly adjusted. For example, f(P_frame_max)=(255−P_frame_max).

Other non-linear adjustments may also be adopted. Considering hardware implementation, division is processed by the Look Up Table (LUT) method, thereby converting division into multiplication.

The local brightness adjustment factor includes: a local brightness down-adjustment factor local_min_y and a local brightness up-adjustment factor local_max_y.

m*n neighboring domains are selected by taking any first pixel as a center. The brightness value of the first pixel and the brightness values of the m*n neighboring domains constitute a local region brightness value set.

Figure 10:
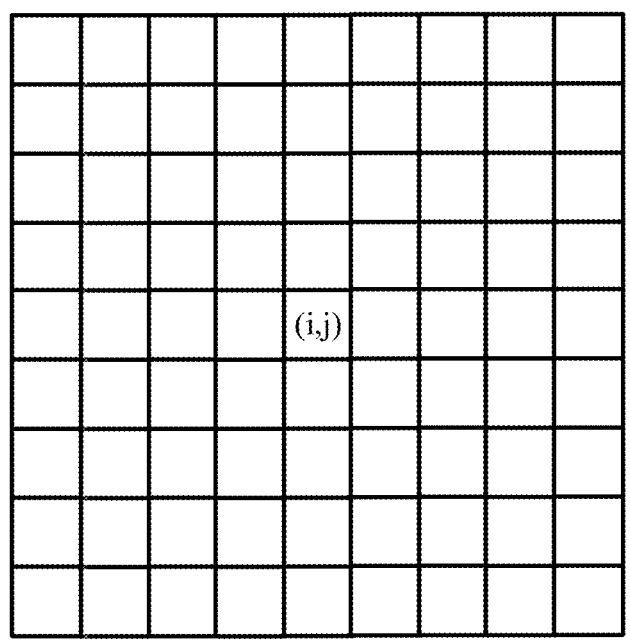
FIG. 10 is a schematic diagram illustrating 9×9 neighboring domains according to some examples of the present disclosure.

Each first pixel corresponds to one coordinate value (i, j). As shown in FIG. 10, with the position of the first pixel as the center of the m*n neighboring domains, the m*n neighboring domains may be 9*9 neighboring domains.

The maximum brightness value P_local_max(i, j), the average brightness value P_local_avg(i, j) and the minimum brightness value P_local_min(i, j) of the local region are determined by traversing the brightness value set of each square in the local region.

Generally, the minimum brightness value and the maximum brightness value of the local region are obtained by searching data of all position points once, and the average brightness value of the local region is obtained by accumulating the brightness values of all first pixels of the local region into a sum and dividing the sum by the total number of first pixels of the local region.

A process of calculating local_min_y(i, j) is similar to the process of calculating global_min_y, which will not be described in detail herein.

A process of calculating local_max_y(i, j) is similar to the process of calculating global_max_y, which will not be described in detail herein.

At step 904, calculating a brightness drive signal corresponding to the first pixel according to the brightness value of each first pixel, the local brightness adjustment factor and the global brightness adjustment factor. The brightness drive signal is used to adjust a transmittance of a corresponding pixel of the first panel, and the global brightness adjustment factor is also used to adjust the output brightness value of a corresponding pixel of the second panel. The dimming data corresponding to the first pixel is calculated through the following steps 9041-9043.

At step 9041, a global brightness adjustment value is calculated.

For a brightness value P(i, j) of any first pixel, if P(i, j)<P_frame_avg, the global brightness adjustment value is:

$$P\_out\_global(i,j)=(P\_frame\_avg-(P\_frame\_min-global\_min\_y))/(P\_frame\_avg-P\_frame\_min)*(P(i,j)-P\_frame\_avg)+P\_frame\_avg,$$

where P_out_global(i, j) is the global brightness adjustment value, and global_min_y is the global brightness down-adjustment factor.

For the brightness value P(i, j) of any first pixel, if P(i, j)=P_frame_avg, the global brightness adjustment value is:

$$P\_out\_global(i,j)=P\_frame\_avg.$$

For the brightness value P(i, j) of any first pixel, if P(i, j)>P_frame_avg, the global brightness adjustment value is:

$$P\_out\_global(i,j)=(P\_frame\_avg-(P\_frame\_max+global\_max\_y))/(P\_frame\_avg-P\_frame\_max)*(P(i,j)-P\_frame\_avg)+P\_frame\_avg,$$

where global_max_y is the global brightness up-adjustment factor.

Figure 11:
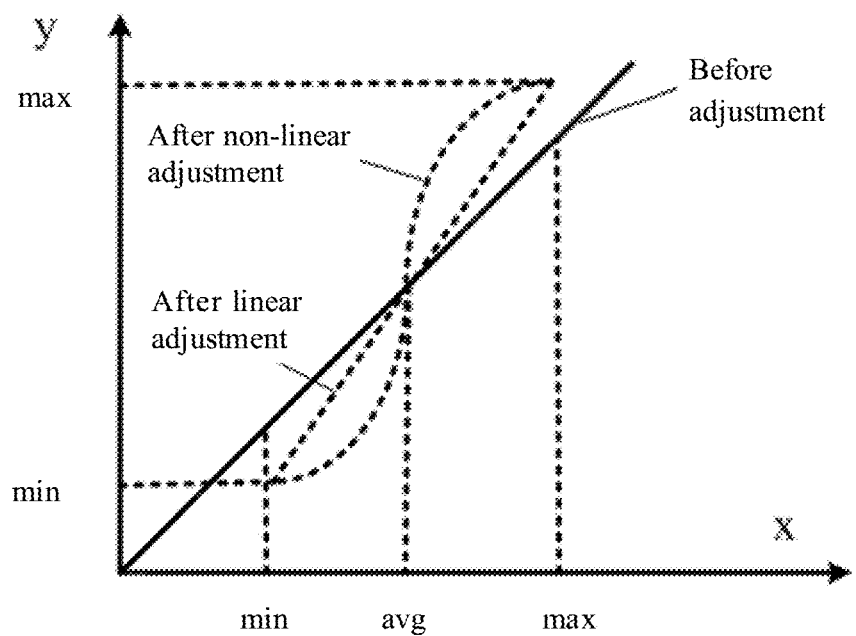
FIG. 11 illustrates a brightness value adjustment curve according to some examples of the present disclosure.

A specific adjustment result is as shown in FIG. 11, where x-axis is P(i, j), and y-axis is the global brightness adjustment value P_out_global (i, j).

At step 9042, a local brightness adjustment value is calculated.

For the brightness value P(i, j) of any first pixel, if P(i, j) is less than P_local_avg(i, j), the local brightness adjustment value is:

$$P\_out\_local(i,j)=(P\_local\_avg(i,j)-(P\_local\_min(i,j)-local\_min\_y(i,j)))/(P\_local\_avg(i,j)-P\_local\_min(i,j))*(P(i,j)-P\_local\_avg(i,j))+local\_avg(i,j),$$

where P_out_local(i, j) is a second brightness adjustment value, and P_local_min_y(i,j) is the local brightness down-adjustment factor.

If P(i, j) is equal to P_local_avg(i, j), the local brightness adjustment value is:

$$P\_out\_local(i,j)=P\_local\_avg(i,j).$$

If P(i, j) is greater than P_local_avg(i, j), the local brightness adjustment value is:

$$P\_out\_local(i,j)=(P\_local\_avg(i,j)-(P\_local\_max(i,j)+local\_max\_y(i,j)))/(P\_local\_avg(i,j)-P\_local\_max(i,j))*(P(i,j)-P\_local\_avg(i,j))+P\_local\_avg(i,j).$$

At step 9043, the brightness drive signal is calculated as follows:

$$P\_out(i,j)=weight\_local(i,j)*P\_out\_local(i,j)+weight\_global*P\_out\_global(i,j);$$

$$weight\_local(i,j)-weight\_global=1;$$

or $$P\_out(i,j)=weight\_local*P\_out\_local(i,j)+weight\_global(i,j)*P\_out\_global(i,j)+weight\_org*P(i,j);$$

$$weight\_local(i,j)+weight\_global+weight\_org(i,j)=1.$$

In the above formulas, weight_org(i, j) is an adjustment coefficient, P_out(i, j) is the brightness drive signal, weight_local(i, j) is a local brightness weight coefficient, and weight_global is a global brightness weight coefficient.

A process of calculating the local brightness weight coefficient in the above formula is described below.

N local modeling regions are selected on the first panel. The local modeling region includes: a modeling brightness value i of a first modeling pixel, modeling brightness values of neighboring domains (m*n) of the first modeling pixel and a local brightness weight coefficient weight_local(i, j)$_{modeling}$ corresponding to the first modeling pixel.

The local modeling region further includes a modeling brightness complexity, i.e., includes an average value $A_{modeling}$ of an appearance frequencies $h_g(i)_{modeling}$ of the modeling brightness value i, a power value Power$_{modeling}$ of the appearance frequency $h_g(i)_{modeling}$ of the modeling brightness value i and an entropy value Entropy$_{modeling}$ of the appearance frequency $h_g(i)_{modeling}$ of the modeling brightness value i of the local modeling region.

A specific calculation process includes: counting the appearance frequency $h_g(i)_{modeling}$ of the modeling brightness value i of the local modeling region by using a histogram;

$$\text{Average value: } A_{modeling} = \frac{1}{M_{modeling}} \sum_i ih_g(i)_{modeling}; \quad (a)$$

$$M_{modeling} = m_{modeling} \times n_{modeling}$$

$$\text{Power value: } Power_{modeling} = \sum_i [h_g(i)_{modeling}]^2 \quad (b)$$

$$\text{Entropy value: } Entropy_{modeling} = -\sum_i h_g(i)_{modeling} lgh_g(i)_{modeling}. \quad (c)$$

Constructing a weight_local(i, j)$_{modeling}$=A$_{modeling}$, Power$_{modeling}$, Entropy$_{modeling}$) curve as a first local brightness weight coefficient curve.

For any first pixel, the average value A(i, j), the power value Power(i, j) and the entropy value Entropy(i, j) of the appearance frequency $h_g(i)$ of the local region brightness value i corresponding to the first pixel are calculated according to the local region brightness value corresponding to the first pixel, and then, the local brightness weight coefficient weight_local(i, j) corresponding to the first pixel is calculated by substituting A(i, j), Power(i, j) and Entropy(i, j) into the weight_local(i, j)$_{modeling}$=A$_{modeling}$, Power$_{modeling}$, Entropy$_{modeling}$) curve.

Optionally, a second local brightness weight coefficient curve is further obtained through the following calculation. P local modeling regions are selected on the first panel, and the local modeling region includes: a modeling brightness value of the local modeling region and a local brightness weight coefficient corresponding to a second modeling pixel. The modeling brightness value of the local modeling region includes: a modeling brightness value of the second modeling pixel and a modeling brightness value of a neighboring domain of the second modeling pixel.

A first modeling frequency set is generated by counting the appearance modeling frequencies of the modeling brightness values of different second modeling pixels in different local modeling regions; a second modeling frequency set is generated by traversing the first modeling frequency set and deleting the modeling frequency smaller than a preset frequency; the modeling number of the modeling brightness values contained in the second modeling frequency set is counted, and the second local brightness weight coefficient curve is constructed according to the modeling number of each local modeling region and the local brightness weight coefficient.

For any first pixel, the number of brightness values with the frequency greater than the preset frequency in the local region brightness values corresponding to the first pixels is counted, and the local brightness weight coefficient corresponding to the first pixel is calculated according to the above number and the second local brightness weight coefficient curve.

Specifically, P local modeling regions are selected on the first panel, and the first modeling frequency set is generated by calculating the appearance frequency $h_g(i)_{modeling}$ of each brightness value in each local modeling region respectively; the second modeling frequency set is generated by traversing the first modeling frequency set and deleting the frequency smaller than the preset frequency; the number count$_{modeling}$ of brightness values contained in the second modeling frequency set is counted; the weight_local$_{modeling}$=f(count$_{modeling}$) curve, that is, the second local brightness weight coefficient curve, is constructed.

The appearance frequencies $h_g(i)$ of different brightness values is counted according to the local region brightness value set corresponding to any first pixel, and the second frequency set is generated traversing the first frequency set and deleting the frequency smaller than the preset frequency, and then, the number count(i, j) of brightness values contained in the second frequency set is counted and then the local brightness weight coefficient weight_local(i, j) corresponding to the first pixel is calculated by and substituting the count(i, j) into the weight_local$_{modeling}$=count$_{modeling}$) curve.

The number count of $h_g(i)$>NUM_th0 is counted. NUM_th0 is the preset frequency, and NUM_th0 is generally 3000. For example, when the resolution of the first panel is, for example, 1920×1080, the range of count is 0-1920×1080. The count is set to an independent variable of the abscissa, weight_local(i, j) is set to a dependent variable of the ordinate, and the numerical range of the local brightness weight coefficient weight_local(i, j) is [0, 1].

When the histogram statistics processing is performed for the local modeling region, the consumption of resources is still relatively large. To further simplify the hardware implementation method, an example of the present disclosure provides another method of calculating the local brightness weight coefficient weight_local(i, j).

Specifically, N local modeling regions are selected on the first panel. If the brightness value of any first pixel in the local modeling region is p(i, j)$_{modeling}$, the brightness values of two first pixels bordering the first pixel, i.e., a brightness value p(i+1, j)$_{modeling}$ of No. 1 first pixel and a brightness value p(i, j+1)$_{modeling}$ of No. 2 first pixel, are determined.

Calculations are performed according to the following formulas.

$$p\_diff0(i, j)_{modeling} = |local\_pixel(i, j)_{modeling} - local\_pixel(i, j \pm 1)_{modeling}|$$

$$p\_diff1(i, j)_{modeling} = |local\_pixel(i, j)_{modeling} - local\_pixel(i \pm 1, j)_{modeling}|$$

$$p\_sum\_diff(i, j)_{modeling} = \sum_{i=0}^{n-1}\sum_{j=0}^{m-1}(P\_diff(i, j)_{modeling} + diff(i, j)_{modeling})$$

$$p\_avg\_diff(i, j)_{modeling} = p\_sum\_diff(i, j)_{modeling}/(m \times n),$$

where p_diff0(i, j)$_{modeling}$ and p_diff1(i, j)$_{modeling}$ are a difference between the brightness value of the first pixel and the brightness value of the No. 2 first pixel and a difference between the brightness value of the first pixel and the brightness value of the No. 1 first pixel respectively. A modeling brightness characteristic p_sum_diff(i, j)$_{modeling}$ or p_avg_diff(i, j)$_{modeling}$ is obtained based on the above formula, where m*n refers to the number of pixels contained in the local region brightness value set.

A p_weight_local$_{modeling}$=f(p_sum_diff$_{modeling}$) curve or a p_weight_local$_{modeling}$=f(p_avg_diff$_{modeling}$) curve is constructed.

For the brightness value p(i, j) of any first pixel, p_sum_diff(i, j) corresponding to the p(i, j) is calculated, and the local brightness weight coefficient weight_local corresponding to the first pixel is calculated by substituting the p_sum_diff(i, j) into the p_weight_local$_{modeling}$=f(p_sum_diff$_{modeling}$) curve; or the p_avg_diff(i, j) corresponding to the p(i, j) is calculated, and then the local brightness weight coefficient weight_local corresponding to the first pixel is calculated by substituting the p_avg_diff(i, j) into the p_weight_local$_{modeling}$=f(p_avg_diff$_{modeling}$) curve.

In some examples, when local sampling is performed, if the central point is in upper several rows and left several columns or in lower several rows and right several columns of the image, the data taken by a template comes from outside the range of the image, and a duplicating method is used in the template.

For example, the template is of a size of 9*9 and the central point is (0,0). The upper left corner is filled with the data of the point (0,0); the data in a row of the upper right corner and a column of the lower left corner is duplicated from the data in the first row and the first column of the template respectively; the data of the lower right corner directly comes from data in the original image; a data filling format is in the form of symmetrical duplication. A column is taken as an example. The template includes columns of −4, −3, −2, −1, 0, 1, 2, 3 and 4. the column −4 is duplicated from the data of the column 4 rather than the data of the column 1, the data of the column −3 is duplicated from the data of the column 3, the column −2 is duplicated from the data of the column 2, and the column −1 is duplicated from the data of the column 1. The data in the upper right corner is also duplicated from the data of (0,0).

Similarly, a method of calculating the global brightness weight coefficient weight_global may be referred to the above method of calculating the local brightness weight coefficient, which will not be described herein.

Optionally, the processor contained in the dual-cell apparatus is further configured to: determine a local color adjustment factor by counting local region RGB value according to RGB value of each second pixel; determine a global color adjustment factor based on global image brightness values of the second panel and global RGB value of the second panel; and calculate a color drive signal corresponding to the second pixel according to the RGB value of the second pixel, the local color adjustment factor and the global color adjustment factor, where the color drive signal is used to adjust the RGB value of the second pixel of the second panel.

The first panel is used to receive the brightness drive signal and adjust a transmittance corresponding to the first pixel according to the brightness drive signal.

The second panel is used to receive the color drive signal and adjust the RGB value corresponding to the second pixel according to the color drive signal.

The processing of medium-high-brightness enhancement is described below.

Figure 12:
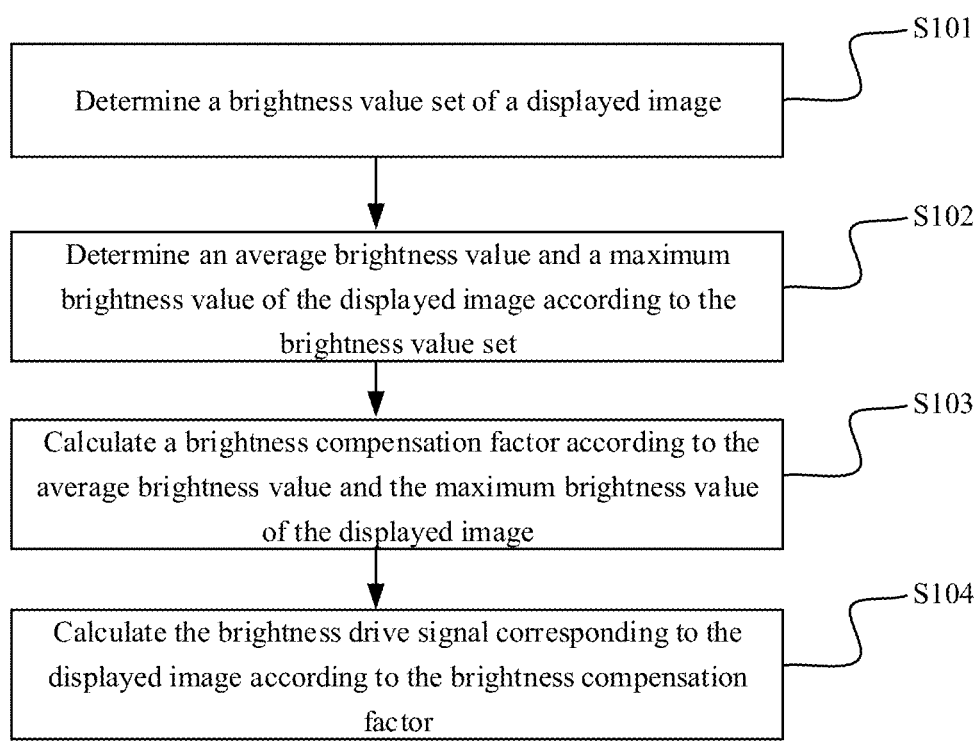
FIG. 12 is a flowchart illustrating a brightness driving method according to some examples of the present disclosure.

A data flow processed by Y contrast enhancement is received for subsequent processing. Specifically, as shown in FIG. 12, the method includes the following steps S101-S104.

At step S101, a brightness value set of a displayed image is determined.

At step S102, an average brightness value Lavg1 and a maximum brightness value L max 1 of the displayed image are determined according to the brightness value set.

It is to be noted that the calculated maximum brightness value L max 1 of the displayed image is not a maximum value of all brightness values but a maximum value in a statistical sense. Generally, after the statistics processing is completed, a grayscale of which the number of pixels is not zero is obtained from grayscale 255 to grayscale 0, and the number of pixels contained in each grayscale is required to exceed a particular threshold (for example, 0.1% of the total number). If the number of pixels of the grayscale does not satisfy the requirement, the number of pixels of the grayscale is accumulated to the number of pixels of the next grayscale, until the number of pixels of the grayscale satisfying the condition is obtained. The grayscale is the maximum brightness value L max 1 of the displayed image. For the calculation of the average brightness value Lavg1 of the displayed image, if the brightness values of the pixels of one displayed image are all accumulated and then divided by the number of pixels, a data bit width of the accumulated sum will generally overflow. Particularly, when the data bit widths are 10 bits and 12 bits, for convenience of calculation, the average brightness value of each row in the displayed image is firstly calculated, and then the average brightness values of n rows are calculated, and then averaging is performed for average brightness values of the n rows and finally the average brightness value Lavg1 of the entire displayed image is obtained.

In some examples, the display apparatus generally displays the displayed image based on a light blending principle. Therefore, each pixel is further divided into three sub-pixels, i.e., R, G and B. Three sub-pixels correspond to different brightnesses, and thus the brightnesses corresponding to different pixels are also different. In this example, when histogram statistics processing is performed for the brightnesses, the brightness in each pixel is a maximum brightness value corresponding to original brightnesses of three sub-pixels in the pixel. During the statistics processing, only one sub-pixel with the maximum brightness value is counted, which leads to a less statistics amount and a less calculation amount than a calculation amount of all sub-pixels. In this case, the statistics processing and the calculation are simpler and faster. On the other hand, the pixel brightness corresponding to the sub-pixel with the largest original brightness in the R, G and B sub-pixels, is used as the statistic amount, which retains original displayed image information of an input displayed image as possible, compared with use of the pixel brightness corresponding to the lowest or middle value of the original brightnesses of three sub-pixels. Thus, the information loss of the input displayed image is less and the display effect of the displayed image is better.

At step 103, a brightness compensation factor is calculated according to the average brightness value and the maximum brightness value of the displayed image.

Specifically, the brightness compensation factor is obtained by substituting the average brightness value and the maximum brightness value of the displayed image into a brightness compensation factor model.

In some examples of the present disclosure, the brightness compensation factor model is pre-constructed. The brightness compensation factor model is constructed based on the maximum brightness value L max 2 of the modeling image and the average brightness value Lavg2 of the modeling image. A process of constructing the brightness compensation factor model includes steps 1031-1035.

At step 1031, n groups of modeling images are selected, where the Lamx2 s of different groups of modeling images are same, and the L max 2 is the maximum brightness value in the modeling image.

For example, n groups of modeling images are selected, where the brightness value of the modeling image is in a range of 0-255. Correspondingly, the maximum brightness value of the modeling image is in the range of 0-255, and the average brightness value of the modeling image is in the range of 0-255.

The maximum brightness values of the selected n groups of modeling images are uniformly distributed in the interval of 0-255. Specifically, if 11 groups of modeling images are selected, the maximum brightness values L max 2 in 11 groups of modeling images are 1, 25, 51, 76, 102, 127, 153, 178, 204, 229 and 255 respectively.

At step 1032, a Lavg2 set is generated by calculating the Lavg2 of each modeling image in any group of modeling images, where the Lavg2 is the average brightness value in the modeling image.

For example, L max 2=25. When L max 2=25, the Lavg2 of the corresponding modeling image is any value of 25, 24, 23, 22, 21, 20, 19, 18, 17, 16, 15, 13, 14, 12, 11, 10, 9, 8, 7, 6, 5, 4, 3, 2, 1 and 0.

The Lavg2 set is formed by Lavg2s of all modeling images in the group of L max 2=25.

At step 1033, a y set is calculated according to the group of L max 2=25 and the Lavg2 set, where the y is the brightness compensation factor.

For the group of L max 2=25, one y is calculated according to one L max 2=25 and one Lavg2, and one y set is obtained according to L max 2=25 and a plurality of Lavg2s.

At step 1034, a y=f(Lavg2, L max 2=25) relationship curve is established according to the group of L max 2=25, the Lavg2 set and the y set.

Figure 13:
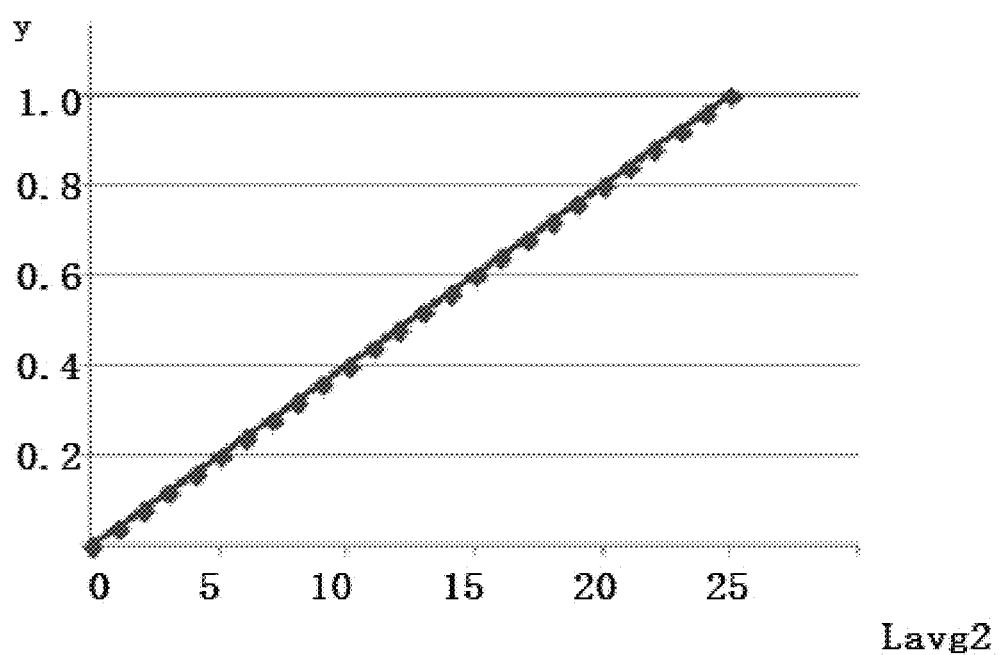
FIG. 13 is a schematic diagram illustrating a maximum brightness value L max 2 of a modeling image (L max 2=25) relationship curve according to some examples of the present disclosure.

For the group of L max 2=25, the y=f(Lavg2, L max 2=25) relationship curve is as shown in FIG. 13.

At step 1035, n relationship curves are constructed as the brightness compensation factor model.

To increase the contrast of the displayed image, in the examples of the present disclosure, the contrast of the display image is determined, which is generated based on the pixel brightness value of the displayed image, and the brightness compensation factor of the whole displayed image is determined according to the contrast. Generally, an image with the large contrast requires an increased contrast as possible. Therefore, the low-scale brightness of the displayed image is appropriately decreased, the high-scale brightness is appropriately increased. Original characteristics are maintained for a scenario with a small contrast as possible.

An example of the present disclosure further provides a method of calculating an average brightness value of each modeling image within each group. Specifically, a first brightness value set is generated by counting brightness values of different pixels of the modeling image; a second brightness value set is generated by traversing the first brightness value set and deleting the brightness value smaller than a preset brightness value; an average brightness value of the second brightness value set, that is, the average brightness value of the modeling image, is calculated.

For example, the preset brightness value is 10, and the pixels with the brightness value being less than 10 are deleted in the process of calculating the average brightness value of the displayed image. For example, the brightness values of three pixels of 10 pixels are less than 10. In this case, the method of calculating the average brightness value is to obtain a result as the average brightness value of the modeling image by summing up the brightness values of the remaining 7 pixels and dividing the obtained sum by 10.

Figure 14:
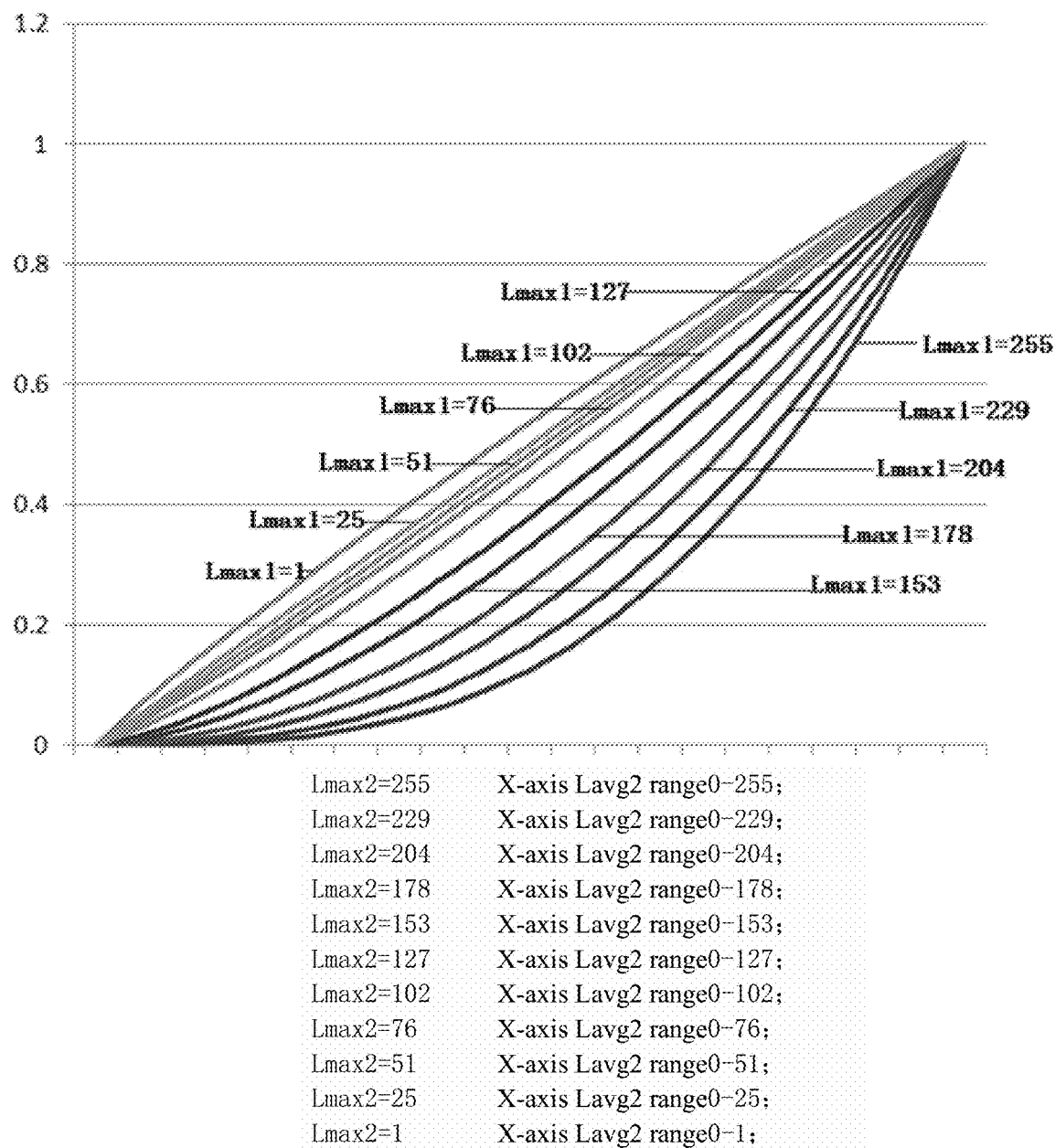
FIG. 14 is a schematic diagram illustrating a brightness compensation factor model according to some examples of the present disclosure.

Specifically, the finally-constructed 11 y=f(Lavg2, L max 2=n) relationship curves are referred to FIG. 14, where a numerical value corresponding to the y-axis is the brightness compensation factor, a numerical value corresponding to the x-axis is Lavg2, and the above 11 relationship curves form the brightness compensation factor model.

The step of calculating the brightness compensation factor by substituting the L max 1 and Lavg1 into the brightness compensation factor model includes steps 1036-1037.

At step 1036, if a L max 1=L max 2 relationship curve exists for the brightness compensation factor model, the brightness compensation factor is obtained according to a corresponding relationship between the Lavg1 s and the brightness compensation factors.

For example, when L max 1=25 and Lavg1=13 in the displayed image, one relationship curve L max 1=L max 2 exists in the brightness compensation factor model shown in FIG. 14. In the relationship curve of L max 2=25, the obtained brightness compensation factor corresponding to Lavg2=13 is the brightness compensation factor of the displayed image.

At step 1037, if the L max 1=L max 2 relationship curve does not exist in the brightness compensation factor model, the brightness compensation factor is calculated through the following several steps.

At step 10371, calibration points index0, index1, index2 and index3 of (L max 1, Lavg1) and weight coefficients weight0, weight1, weight2 and weight3 corresponding to the calibration points are calculated.

At step 10372, brightness compensation factors date0, date1, date2 and date3 corresponding to index0, index1, index2 and index3 are determined by traversing the brightness compensation factor model.

At step 10373, the brightness compensation factor is obtained according to $y = (\Sigma_{i=0}^{3} data(i) \times weight(0)) >> 16$.

A process of calculating the calibration points and the weight coefficients is described below.

$$step\_h;$$

$$index\_x = (Lavg \times step\_h) >> 14;$$

$$m_0 = (step\_h \times Lavg) \& 0x3fff;$$

$$m_1 = (1 << 14) - m_0;$$

$$step\_v;$$

$$index\_y = (Lmax \times step\_v) >> 14;$$

$$n_0 = (step\_v \times Lmax) \& 0x3fff;$$

$$n_1 = (1 << 14) - n_0;$$

$$index0 = index\_y \times N + index\_x;$$

$$index1 = index\_y \times N + (index\_x + 1);$$

$$index2 = (index\_y + 1) \times N + index\_x;$$

$$index2 = (index\_y + 1) \times N + (index\_x + 1);$$

$$weight0 = (m_1 \times n_1) >> 12;$$

$$weight1 = (m_0 \times n_1) >> 12;$$

$$weight2 = (m_1 \times n_0) >> 12;$$

$$weight3 = (m_0 \times n_0) >> 12.$$

In the above formulas, step h refers to a valuing step length in an average value direction, step v refers to a valuing step length in a maximum value direction, and N is the number of relationship curves.

For example, for any displayed image, if Lavg1 is calculated as 30 and L max 1 is calculated as 60, the average brightness value and the maximum brightness value of the displayed image form a point (30, 60).

Figure 15:
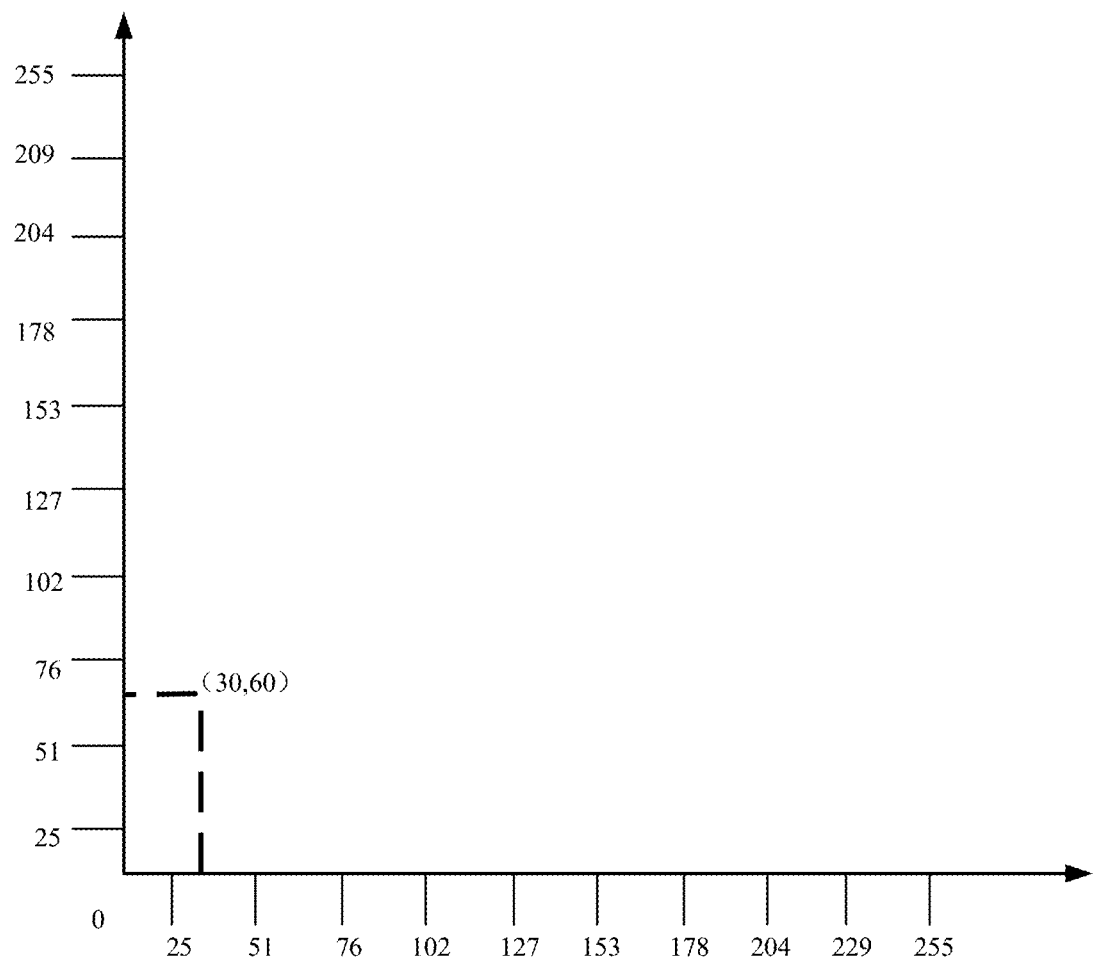
FIG. 15 is a schematic diagram illustrating an entry according to some examples of the present disclosure.

A specific reference is made to FIG. 15 if an entry is established for the modeling image based on Lavg2 and L max 2. The entry is established with Lavg2 as an abscissa and L max 2 as an ordinate.

With continuous reference to FIG. 15, a process of determining the calibration points of (30, 60) includes: determining two Lavg2 values adjacent to 30 in the entry as 25 and 51; and determining two L max 2 values adjacent to 60 in the entry as 51 and 76, thereby forming four calibration points index0, index1, index2 and index3.

The specific calculation process is: assuming that $$step\_h = 160;$$

$$Index\_x = (30 \times 160) >> 14;$$

$$m_0 = (160 \times 30) \& 0x3fff;$$

$$m_1 = (1 << 14) - m_0;$$

$$step\_v = 160;$$

$$Index\_x = (60 \times 160) >> 14;$$

$$n_0 = (160 \times 60) \& 0x3fff$$

$$n_1 = (1 << 14) - n_0$$

$$index0 = index\_y \times 11 + index\_x;$$

$$index1 = index\_y \times 11 + (index\_x + 1);$$

$$index2 = (index\_y + 1) \times 11 + index\_x;$$

$$index2 = (index\_y + 1) \times 11 + (index\_x + 1).$$

In the above formulas, index0 is (25, 51); index1 is (51, 51); index2 is (25, 76); index3 is (51, 76); the brightness compensation factors data0, data1, data2 and data3 corresponding to four calibration points (25, 51), (51, 51), (25, 76) and (51, 76) are determined in the brightness compensation factor model shown in FIG. 14. The weight coefficients corresponding to four calibration points respectively are:

$$weight0 = (m_1 \times n_1) >> 12;$$

$$weight1 = (m_0 \times n_1) >> 12;$$

$$weight2 = (m_1 \times n_0) >> 12;$$

$$weight3 = (m_0 \times n_0) >> 12;$$

$$\text{brightness compensation factor} = (\Sigma_{i=0}^{3} data\_i \times weight\_i) >> 16.$$

At step S104, the brightness drive signal corresponding to the displayed image is calculated according to the brightness compensation factor.

Optionally, the steps of calculating the brightness drive signal corresponding to each frame of displayed image according to the brightness compensation factor includes: obtaining the brightness drive signal corresponding to each frame of displayed image by compensating the brightness corresponding to each frame of displayed image according to the brightness compensation factor; and determining whether the brightness drive signal is greater than or equal to the maximum brightness value of the display apparatus.

It is assumed that M is the maximum brightness value of the display apparatus. If the display apparatus with an 8-bit channel includes 256 brightnesses and the maximum brightness value is 255, M is 255. If the display apparatus with a 10-bit channel includes 1024 brightnesses and the maximum brightness value is 1023, M is 1023.

The enhanced brightness value exceeds a range, and thus the value is required to be limited within a data range. Generally, for 8-bit data, if the brightness value obtained by multiplying the current brightness value by its respective y (the brightness compensation factor) is greater than 255, let output brightness value be 255.

If the brightness value is less than 255, the brightness drive signal is obtained by calculation according to the brightness compensation factor.

Figure 16:
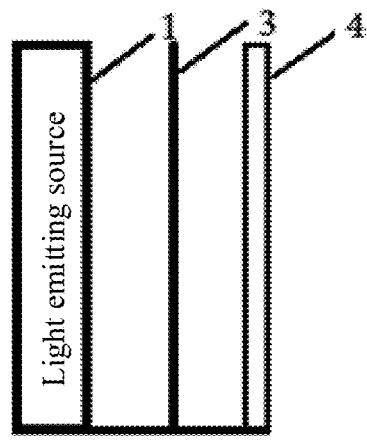
FIG. 16 is a block diagram illustrating a structure of a dual-cell brightness adjustment apparatus according to some examples of the present disclosure.
Figure 17:
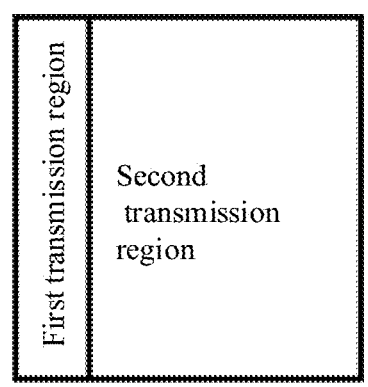
FIG. 17 is a schematic diagram illustrating a dual-cell liquid crystal display apparatus according to some examples of the present disclosure.

In another example, a structure of a dual-cell display apparatus is as shown in FIG. 16. The dual-cell display apparatus includes: a light emitting source 1, a first panel 3 and a second panel 4. Transmittances of different transmission regions of the first panel 3 are different. Therefore, the light emitting from the light emitting source 1 presents different brightnesses in different regions after passing through the first panel 3 to obtain an effect that different regions of one displayed image have different background brightnesses. When the first panel 3 adjusts the brightness, an RGB coordinate system is generally converted into one of a YCbCr coordinate system, a YUV coordinate system, an HSV coordinate system and an HIS coordinate system, thereby enhancing brightness and chromaticity respectively to achieve the adjustment of an overall contrast of the displayed image. FIG. 17 is an exemplary diagram illustrating the first panel 3 according to some examples of the present disclosure. The first panel 3 has a first transmission region and a second transmission region. Transmittance of the first transmission region is 20%, and transmittance of the second transmission region is 80%. The light emitting from the light emitting source 1 provides background light for the second panel 4 after passing through the first panel 3. At this time, the background light of a region in the second panel 4 corresponding to the first transmission region is darker and the background light of a region in the second panel 4 corresponding to the second transmission region is brighter.

Figure 18:
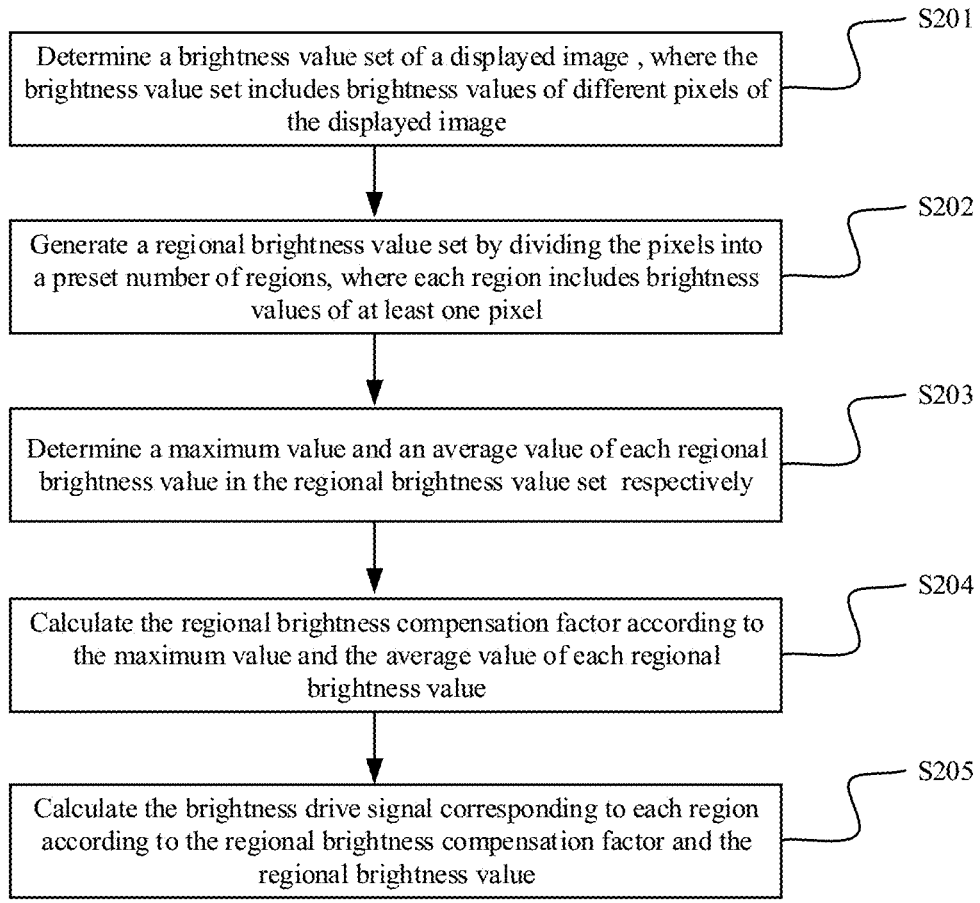
FIG. 18 is a flowchart illustrating a brightness driving method according to some examples of the present disclosure.

For the above dual-cell display apparatus, the brightness of the background light of a fixed region of the second panel 4 is constant. When the brightnesses of a first frame of image and a second frame of image are obviously different, a high-brightness area cannot be highlighted, resulting in a distorted medium-high-brightness area. To solve the above problem, a brightness driving method is provided according to a second aspect of an example of the present disclosure. The method is applied to the first panel 3 of the dual-cell display apparatus. As shown in FIG. 18, the method includes steps S201-S205.

At step S201, a brightness value set of a displayed image is determined, where the brightness value set includes brightness values of different pixels of the displayed image.

At step S202, a regional brightness value set is generated by dividing the pixels into a preset number of regions, where each region includes brightness values of at least one pixel.

Figure 19:
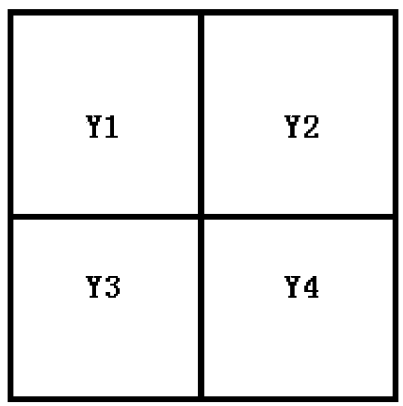
FIG. 19 is a schematic diagram illustrating a region of a displayed image according to some examples of the present disclosure.

For example, data of four points is down-sampled to data of one point. That is, pixels of 3840*2160 are divided into small regions of 1920*1080, and each region is as shown in FIG. 19.

At step S203, a maximum value and an average value of each regional brightness value in the regional brightness value set are determined respectively.

A method of calculating the regional brightness includes steps S2031-S2032.

At step S2031, Py-sum and Py-avg in the region are calculated, and Py-max and Py-mid in the region are determined. Py-sum is a sum of brightnesses of the pixels, Py-max is a maximum brightness value of the pixel, Py-avg is an average brightness value of the pixel, and Py-mid is a middle brightness value of the pixel.

A method of determining Py-max and Py-mid includes: determining Py-max by placing Y1, Y2, Y3 and Y4 in an ascending or descending order. The middle value Py-mid of four pieces of brightness data is an average value of two pieces of brightness data in the middle, or any one of two pieces of brightness data in the middle.

At step S2032, $index_{brightness}$ is calculated according to $index_{brightness}=(a \times Py\text{-}max+b \times Py\text{-}avg+c \times Py\text{-}mid+512)>>10$, where the $index_{brightness}$ is the regional brightness.

In the above formula, a, b and c are arbitrarily configured as long as a+b+c=1024 and a, b and c are all positive integers.

An example of the present disclosure provides a Py-mid displacement valuing method. The method avoids a process of sorting brightnesses of pixels, thereby reducing a data processing amount of a processor, and increases an overall process speed.

A specific operation process includes steps S20321-S20323. At step S20321, Py-sum and Py-avg in the region are calculated, and Py-max and Py-min in the region are determined. Py-sum is the sum of brightnesses value of the pixels, Py-max is the maximum brightness value of the pixels, Py-avg is the average brightness value of the pixels, and Py-min is a minimum brightness value of the pixels.

At step S20322, Py-mid is calculated according to $Py\text{-}mid=(Py\text{-}sum-Py\text{-}max-Py\text{-}min+1)>>1$, where the Py-mid is the middle brightness value of the pixels.

At step S20323, $index_{brightness}$ is finally calculated according to $index_{brightness}=(a \times Py\text{-}max+b \times Py\text{-}avg+c \times Py\text{-}mid+512)>>10$, where the $index_{brightness}$ is the regional brightness value. a, b and c are arbitrarily configured as long as a+b+c=1024 and a, b and c are all positive integers.

The brightnesses of 3840*2160 pixels of the displayed image are combined and converted into 1920*1080 regional brightnesses. The 1920*1080 regional brightnesses form a regional brightness set, and correspondingly, the brightness of the displayed image is the set of the 1920*1080 regional brightnesses.

In some examples of the present disclosure, 1920*1080 regional brightnesses are calibrated. Specifically, each value or some values of the regional brightness set is/are required to reach a target value (a measured value by an instrument), and the brightness data reaching the target value is filled in the regional brightness set. Each regional brightness is calibrated if the displayed image is made to be accurate.

Generally, some fixed sampling points are calibrated in an engineering implementation. After the sampling points are determined (equally spaced or unequally spaced), other brightness values are obtained by an interpolation method or a data fitting method.

A method of sampling specified curves is also used. For example, $y=x$, $y=x^{\gamma}$, $\gamma=2.2$, 2.3, 0.45. Determination is performed according to characteristics of the display panel and finally-desired expression characteristics.

At step S204, the regional brightness compensation factor is calculated according to the maximum value and the average value of each regional brightness value.

The brightness compensation factor according to some examples of the present disclosure is an entire brightness compensation factor, or a regional brightness compensation factor. Accordingly, a corresponding compensation method is an entire brightness enhancement method or a regional brightness enhancement method.

(1) The brightness compensation factor of the entire brightness enhancement method is calculated as follows: the maximum brightness value L max 1 and the average brightness value Lavg1 of the displayed image are calculated. Specific operations may be referred to the above examples, which will not be described herein.

The brightness compensation factor is calculated by substituting L max 1 and Lavg1 into the brightness compensation factor model. The construction manner of the brightness compensation factor model is similar to the construction manner of the brightness compensation factor model in the above examples. Therefore, a reference may be made to the above examples.

Enhancement is performed for the data of the regional brightnesses $index_{brightness}$ respectively. The enhanced brightness data shall be limited within the data range if exceeding the range. Generally, for the 8-bit data, if the data obtained by multiplying the brightness data by its respective y (the brightness compensation factor) is greater than 255, the output brightness data is 255.

(2) The brightness compensation factor of the regional brightness enhancement method is calculated as follows: the regional brightness compensation factor within each region is calculated respectively.

In some examples of the present disclosure, 3840*2160 pixels of the displayed image are converted into 1920*1080 regions. To improve an adjustment accuracy, the brightness compensation factor corresponding to each region is calculated respectively in the examples of the present disclosure. Specifically, an average brightness value Lavg3 of each region and a maximum brightness value L max 3 of the region are firstly calculated; the regional brightness compensation factor is calculated by substituting L max 3 and Lavg3 into the brightness compensation factor model.

At step S205, the brightness drive signal corresponding to each region is calculated according to the regional brightness compensation factor and the regional brightness value.

The regional brightness is enhanced, and a specific method of calculating the brightness drive signal is performed by multiplying each regional brightness by the brightness compensation factor.

The brightness compensation factor according to some examples of the present disclosure is an entire brightness compensation factor, or a regional brightness compensation factor. Correspondingly, the corresponding compensation method is an entire brightness enhancement method or a regional brightness enhancement method.

The step of calculating the brightness drive signal corresponding to each region according to the regional brightness compensation factor and the regional brightness includes: obtaining the brightness drive signal corresponding to each region by compensating the regional brightness corresponding to each region according to the regional brightness compensation factor; and determining whether the brightness drive signal is greater than or equal to the maximum brightness value of the display apparatus. If yes, the brightness drive signal is the maximum brightness value of the display apparatus; if not, the brightness drive signal is obtained by calculation according to the regional brightness compensation factor and the regional brightness.

The enhanced brightness data may exceed a range, and thus is to be limited within the data range. Generally, for the 8-bit data, if the data obtained by multiplying the brightness data by its respective y is greater than 255, the output brightness data is 255.

The above descriptions are only specific examples of the present disclosure, but the scope of protection of the present disclosure is not limited to the above descriptions. Any person skilled in the art may easily conceive of changes or substitutions within the technical scope disclosed in the present disclosure, and such changes and substitutions shall fall within the protection scope of the present disclosure. Therefore, the protection scope of the present disclosure shall be subject to the protection scope of the claims.

The invention claimed is:

1. A dual-cell display apparatus, comprising:
   a first panel;
   a second panel disposed in a first preset order relative to the first panel;
   a memory storing instructions; and
   a processor in communication with the memory, wherein, when executing the instructions, the processor is configured to:
   receive an image signal,
   generate dimming data for the first panel according to the received image signal, and perform edge blurring processing before outputting the dimming data,
   generate image data for the second panel according to the received image signal, and
   generate backlight data for backlight control according to the received image signal.

2. The dual-cell display apparatus according to claim 1, wherein, when executing the instructions, the processor is configured to perform resolution reduction processing for the received image signal.

3. The dual-cell display apparatus according to claim 1, further comprising:
   a backlight module, comprising a plurality of backlight partitions.

4. The dual-cell display apparatus according to claim 3, further comprising:
   a backlight control processor configured to generate control information for controlling the backlight module according to the backlight data; and
   a backlight driver configured to drive a backlight lamp on the backlight module according to the control information.

5. The dual-cell display apparatus according to claim 4, wherein the backlight control processor is further configured to:
   determine a backlight gain value according to an average backlight value of the plurality of backlight partitions; and
   generate the control information according to the backlight gain value.

6. The dual-cell display apparatus according to claim 4, wherein the backlight control processor is further configured to:
   divide the plurality of backlight partitions into a plurality of backlight regions;
   determine a backlight gain value according to an average backlight value of each of the plurality of backlight regions; and
   generate the control information according to each backlight gain value.

7. The dual-cell display apparatus according to claim 1, wherein, when executing the instructions, the processor is configured to:
   generate the backlight data for the backlight control according to the dimming data.

8. The dual-cell display apparatus according to claim 7, wherein, when executing the instructions, the processor is configured to:
   generate the backlight data for the backlight control by performing resolution reduction processing and time filtering processing for the dimming data.

9. The dual-cell display apparatus according to claim 1, wherein, when executing the instructions, the processor is configured to:

generate the image data for the second panel by performing image compensation processing according to the dimming data.

10. The dual-cell display apparatus according to claim 1, wherein:
the first panel comprises a first polarizer and a second polarizer, a polarization direction of the first polarizer and a polarization direction of the second polarizer are perpendicular to each other; and
the second panel comprises a third polarizer and a fourth polarizer, a polarization direction of the third polarizer and the polarization direction of the second polarizer are parallel to each other, and the polarization direction of the third polarizer and a polarization direction of the fourth polarizer are perpendicular to each other.

11. The dual-cell display apparatus according to claim 1, wherein:
the first panel comprises a first polarizer and a second polarizer, a polarization direction of the first polarizer and a polarization direction of the second polarizer are perpendicular to each other,
the second panel comprises a fourth polarizer, a polarization direction of the fourth polarizer and the polarization direction of the second polarizer are perpendicular to each other.

12. The dual-cell display apparatus according to claim 1, wherein the first panel is further configured to:
receive a brightness drive signal; and
adjust a transmittance of a pixel of the first panel according to the brightness drive signal.

13. A dual-cell display apparatus, comprising:
a first panel;
a second panel disposed in a first preset order relative to the first panel;
a memory storing instructions;
a processor in communication with the memory, wherein, when executing the instructions, the processor is configured to:
receive an image signal,
generate dimming data for the first panel according to the received image signal,
generate image data for the second panel according to the received image signal, and
generate backlight data for backlight control according to the received image signal; and
wherein the second panel is further configured to:
receive a color drive signal; and
adjust an RGB value of a pixel of the second panel according to the color drive signal.

14. A dual-cell display apparatus, comprising:
a first panel;
a second panel disposed in a first preset order relative to the first panel;
a memory storing instructions;
a processor in communication with the memory, wherein, when executing the instructions, the processor is configured to:
receive an image signal,
generate dimming data for the first panel according to the received image signal,
generate image data for the second panel according to the received image signal, and
generate backlight data for backlight control according to the received image signal; and
wherein:
the first panel further comprises a first transmission region and a second transmission region, the first panel is configured to transmit light received from a backlight module to the second panel as background light; and
a transmittance of the first transmission region is different from a transmittance of the second transmission region.

* * * * *